United States Patent
Murakami et al.

[11] Patent Number: 6,089,750
[45] Date of Patent: Jul. 18, 2000

[54] NONCONTACT TEMPERATURE DISTRIBUTION MEASURING APPARATUS

[75] Inventors: Daisuke Murakami; Hideki Moriguchi; Akihiko Ikegaya, all of Hyogo, Japan

[73] Assignee: Sumitomo Electric Industries, Ltd., Osaka, Japan

[21] Appl. No.: 09/159,628

[22] Filed: Sep. 24, 1998

[30] Foreign Application Priority Data

Sep. 30, 1997 [JP] Japan ..................................... 9-267379
Sep. 30, 1997 [JP] Japan ..................................... 9-267385

[51] Int. Cl.$^7$ .............................. G01J 5/00; B26D 7/00; G01K 3/00; G01K 7/00

[52] U.S. Cl. .......................... 374/124; 374/101; 374/137; 374/167; 83/16; 83/171; 702/33; 702/40; 700/59; 700/160; 700/175

[58] Field of Search ..................................... 374/124, 101, 374/102, 104, 110, 112, 137, 167; 83/171, 16; 702/33, 40, 132, 134, 136, FOR 142, 59, 160, 175, 179, 299

[56] References Cited

U.S. PATENT DOCUMENTS

| | | | |
|---|---|---|---|
| 2,879,424 | 3/1959 | Garbuny et al. | 374/124 |
| 3,635,085 | 1/1972 | Shimotsuma et al. | 374/137 |
| 3,803,413 | 4/1974 | Vanzetti et al. | 374/124 |
| 4,365,307 | 12/1982 | Tatsuwaki et al. | 374/124 |
| 4,456,390 | 6/1984 | Junkert et al. | 374/124 |
| 5,292,195 | 3/1994 | Crisman | 374/124 |
| 5,580,172 | 12/1996 | Bhardwaj et al. | 374/137 |
| 5,877,688 | 3/1999 | Morinaka et al. | 374/45 |

FOREIGN PATENT DOCUMENTS 0196130  8/1986  Japan ..................................... 374/137

OTHER PUBLICATIONS

"A New Instrument to Optimize Cutting Processes: In Situ Temperature Measurement on Diamon–coated Tools", P. Müller–Hummel et al, Innovations in Materials Research, vol. 1, No. 1 (1996), pp. 1–9.

"Assessment of Steady–State Metal Cutting Temperature Models Based on Simultaneous Infrared and Thermocouple Data", D.A. Stephenson, Journal of Engineering for Industry, May 1991, vol. 113, pp. 121–128.

*Primary Examiner*—G. Bradley Bennett
*Assistant Examiner*—Gail Verbitsky
*Attorney, Agent, or Firm*—McDermott, Will & Emery

[57] ABSTRACT

A material to be cut has a face to be cut with a cutting tool, and a cutout which temporarily brings the cutting tool into a noncontact state. Images of the cutting tool during the period when it attains an exposed state by passing over the cutout are captured with a camera mechanism at an interval of a predetermined delay time τ. A plurality of image information items obtained by these capturing operations include temperature change information of each location as the cutting tool gradually passes from the point of instant when it enters the cutout. Therefore, the image information items are arranged in relation to the exposure time from the point of instant, and a two-dimensional temperature distribution of the cutting tool at the point of instance is computed according to the tendency of change in image information.

9 Claims, 26 Drawing Sheets

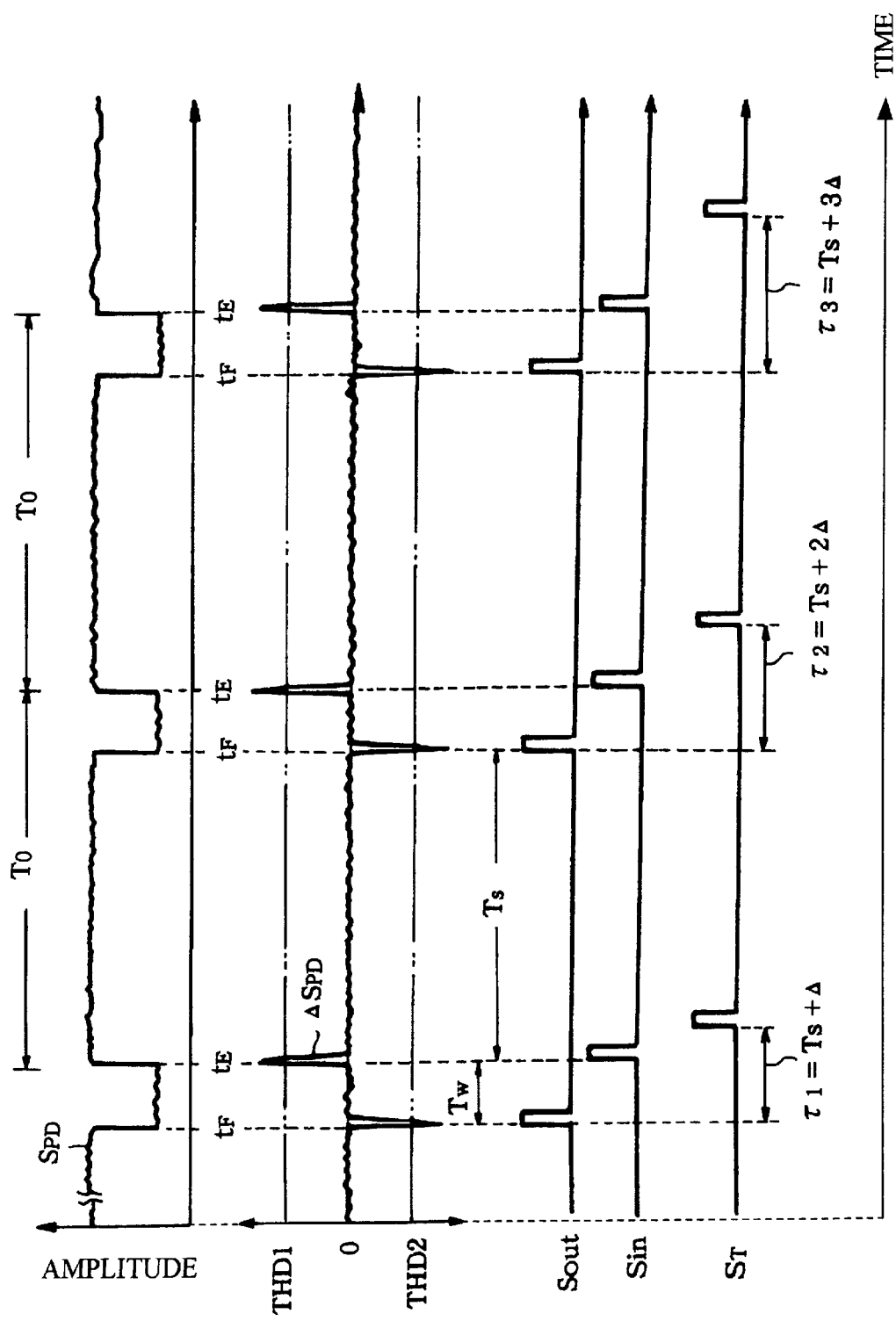

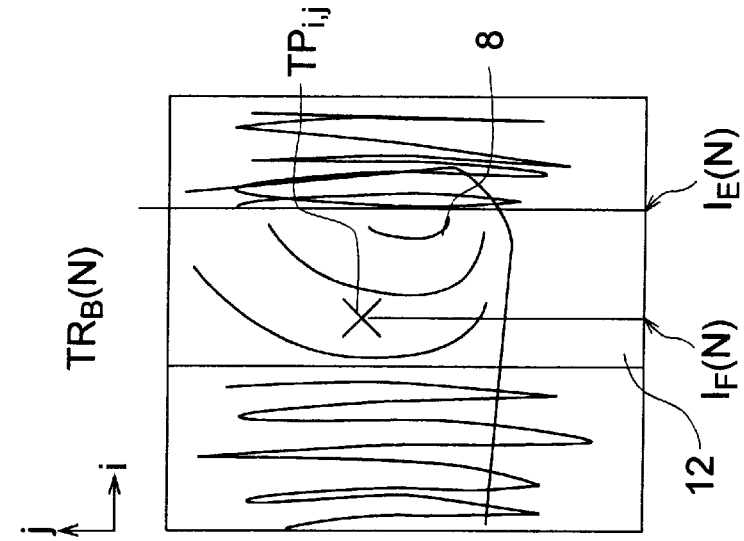
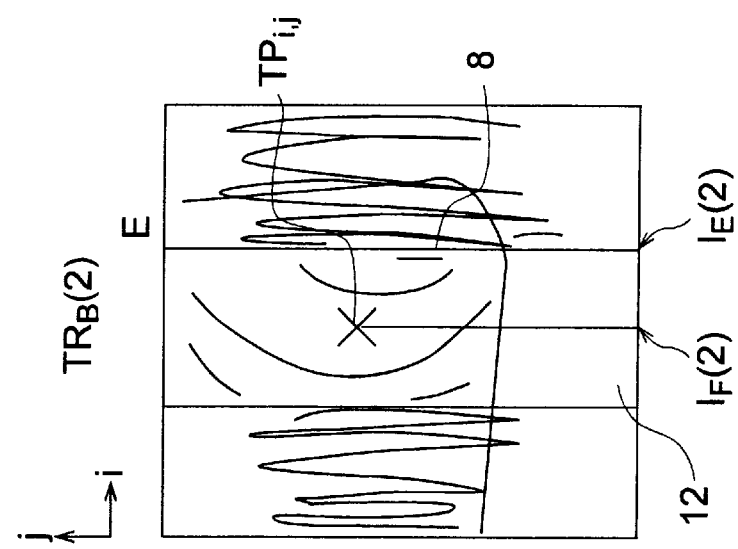
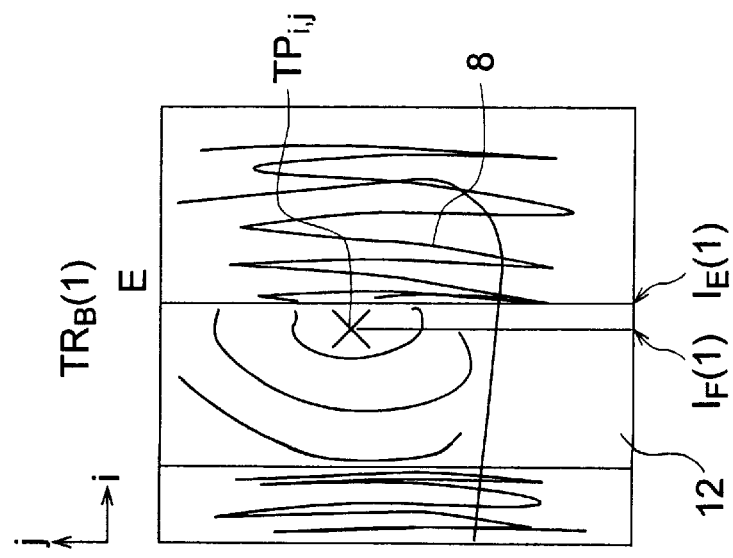

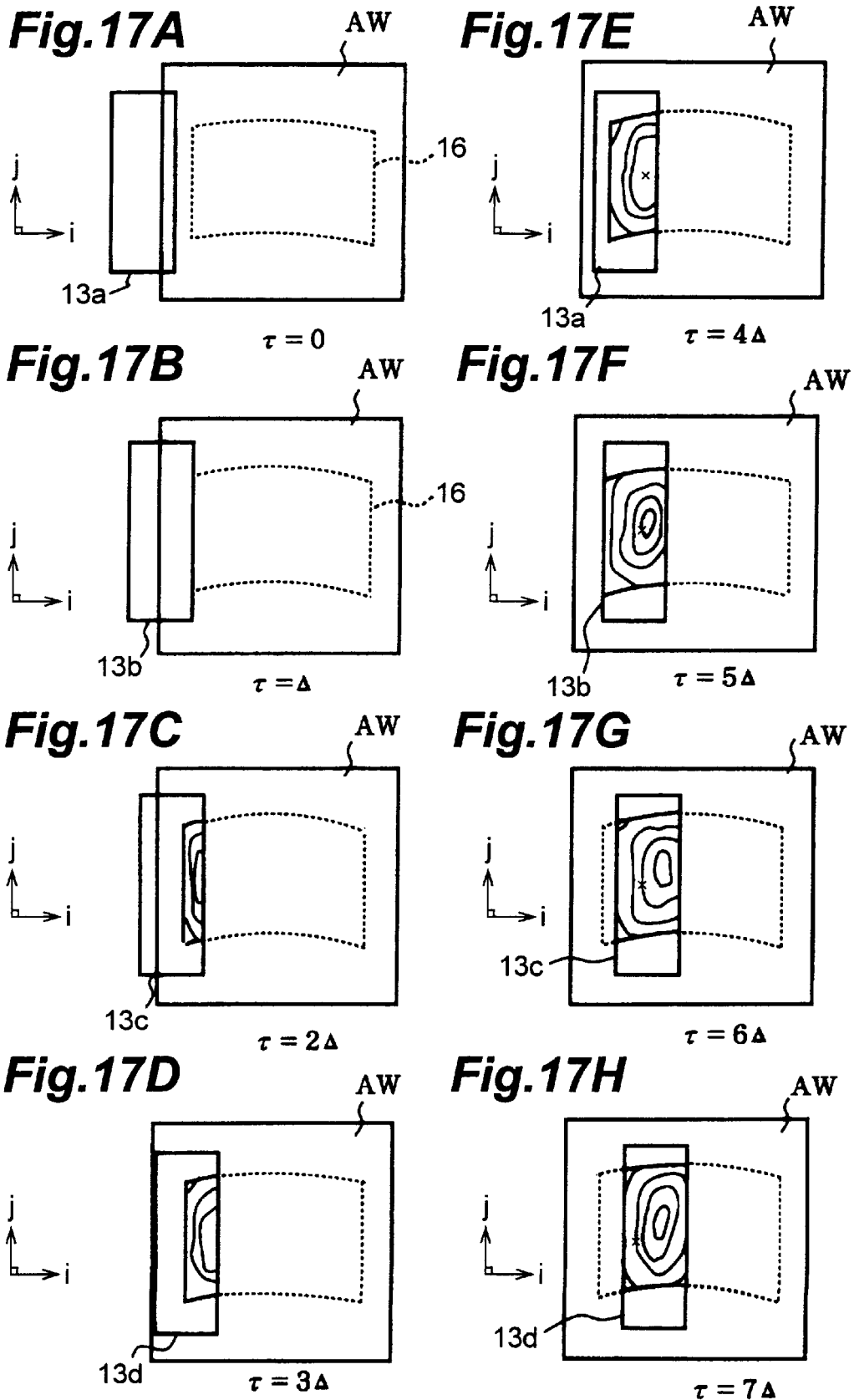

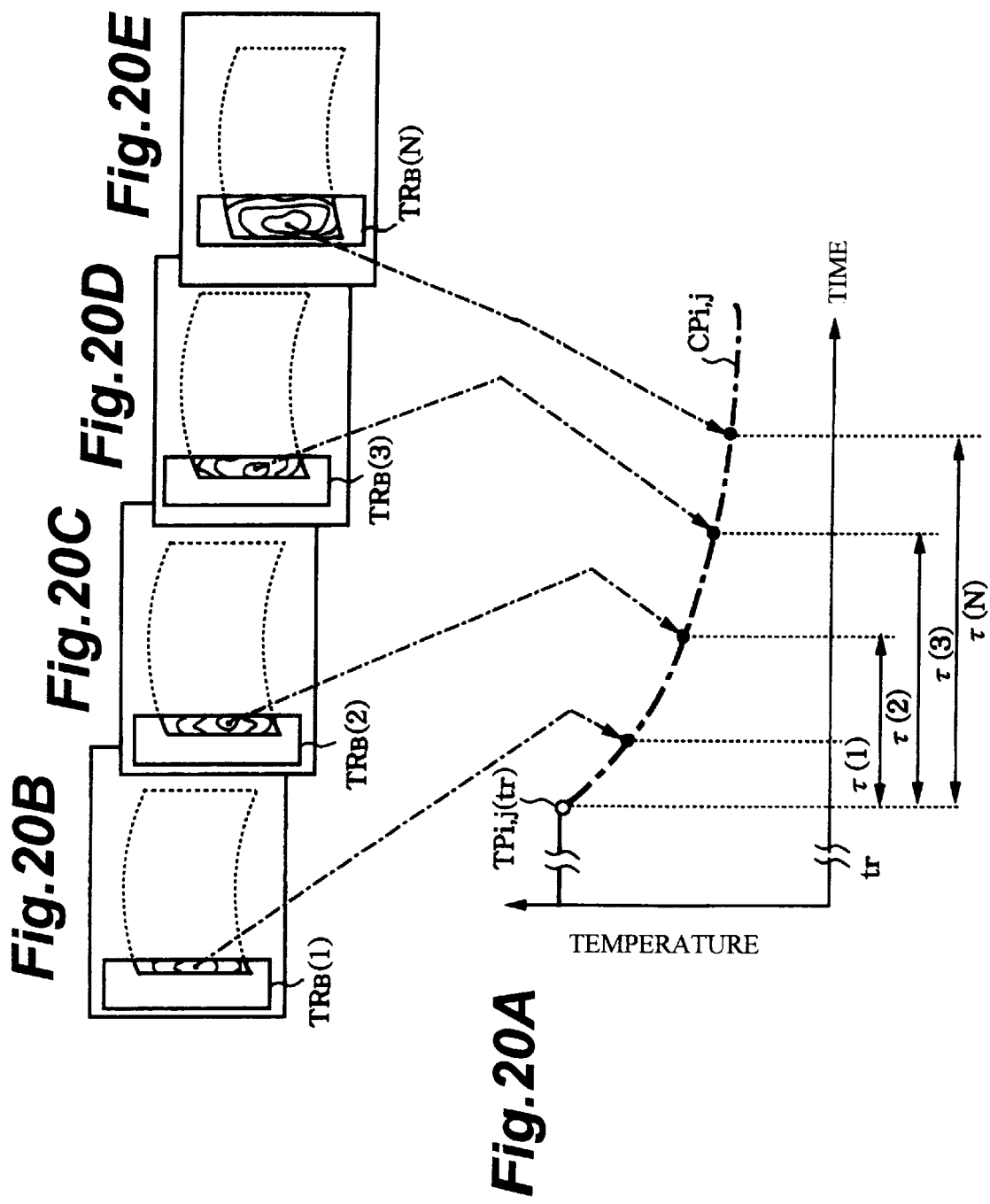

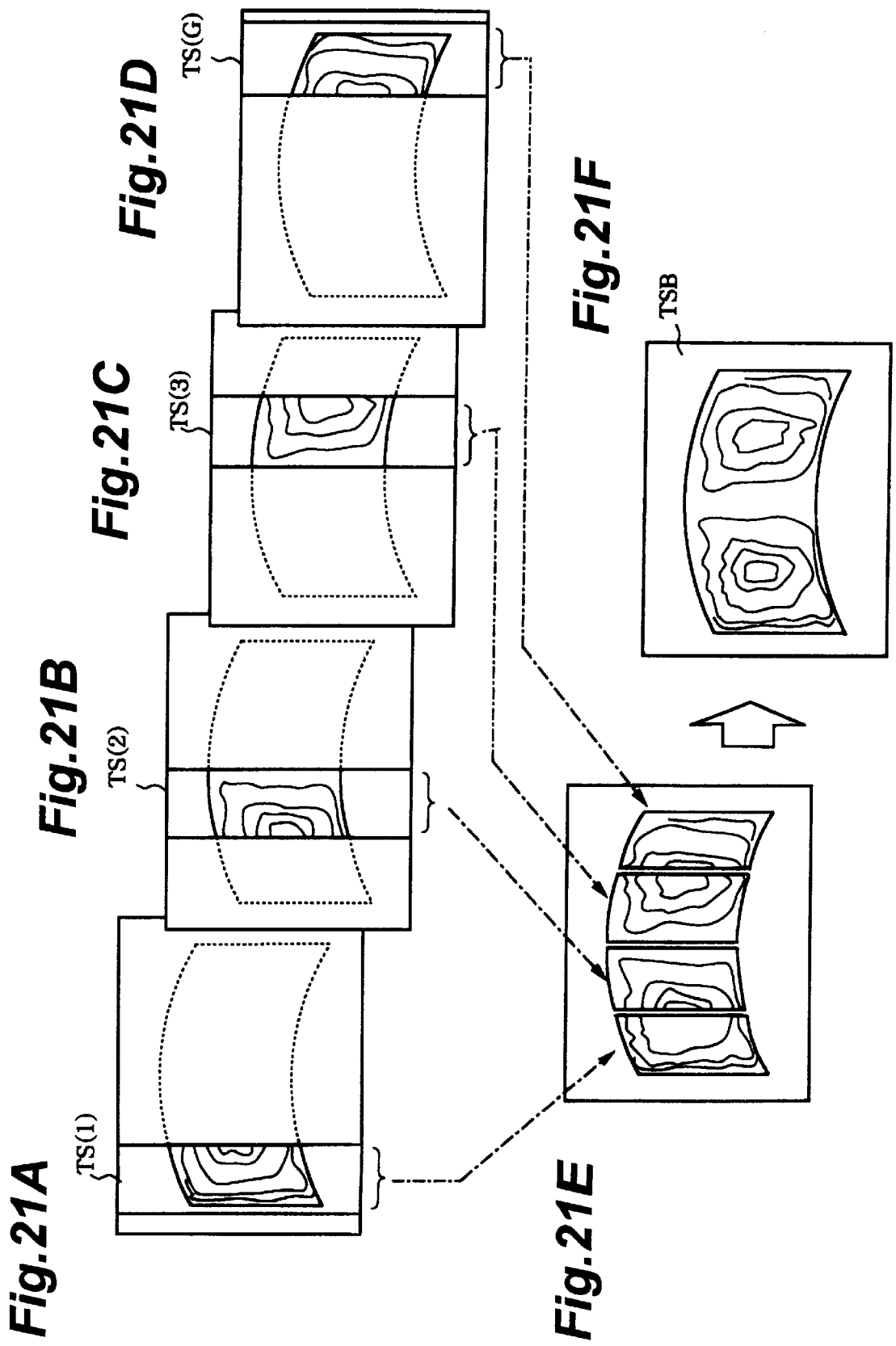

NONCONTACT TEMPERATURE DISTRIBUTION MEASURING APPARATUS

BACKGROUND OF THE INVENTION

1. Field of the Invention

The present invention relates to a noncontact temperature distribution measuring apparatus for measuring a two-dimensional temperature distribution of an object surface in a noncontact state.

2. Related Background Art

Typically known as an apparatus for measuring a surface temperature of an object is a far-infrared image forming apparatus (thermograph) which captures a far-infrared image radiated from the object surface.

SUMMARY OF THE INVENTION

Since the above-mentioned far-infrared image forming apparatus measures a temperature distribution by capturing a surface image of the object, it is problematic in that, when an obstacle exists between the object surface and the imaging section of the apparatus, the temperature distribution cannot be measured or the accuracy in measurement remarkably deteriorates. For example, in the case where the apparatus is used for measuring a two-dimensional temperature distribution of a cutting tool during a cutting process, chips formed from the material being cut during the cutting process may hide the cutting tool, thus making it impossible to measure the two-dimensional temperature distribution at the cutting edge, rake face, or the like of the cutting tool. Also, for example, in the case where the apparatus is used for measuring a two-dimensional temperature distribution of a contact face in one of two objects which rotate in contact with each other or the like, the other object may hide the contact face, thus making it impossible to measure the two-dimensional temperature distribution of the contact face. Therefore, it is an object of the present invention to overcome these problems and provide a noncontact temperature distribution measuring apparatus which can measure a two-dimensional temperature distribution of an object surface with a high accuracy in a noncontact state.

In order to overcome the above-mentioned problems, the noncontact temperature distribution measuring apparatus in accordance with the present invention is a noncontact temperature distribution measuring apparatus for measuring a two-dimensional temperature distribution of a cutting tool during a cutting process, the apparatus comprising cutting state setting means for setting, during the cutting process, a substantial cutting period for bringing the cutting tool and a material to be cut in contact with each other and a substantial noncutting period for separating the cutting tool and the material to be cut from each other; imaging means for capturing the cutting tool a plurality of times at an interval of a predetermined delay time; changing characteristic computing means for relating a plurality of image information items obtained upon a plurality of capturing operations effected by the imaging means, for each information item corresponding to an identical location of the cutting tool, to an exposure time which has elapsed from a switching point of time from the cutting period to the noncutting period, so as to determine a tendency of change in the image information with respect to the exposure time; and temperature distribution computing means for computing the two-dimensional temperature distribution of the cutting tool at the switching point of time according to the tendency of change determined by the changing characteristic computing means, wherein the imaging means has an imaging optical system which is set such as to effect imaging at a focal length not shorter than 50 mm and a resolving power finer than 30 µm.

Since the cutting state setting means sets the substantial noncutting period for separating the cutting tool and the material to be cut from each other, a captured image which would not be disturbed by chips can be obtained. As images of the cutting tool are captured a plurality of times at a plurality of different delay times with reference to the switching point of time, a plurality of exposure image information items of the cutting tool are obtained. Relating these plurality of image information items, for each information item corresponding to an identical location of the cutting tool, to the exposure time that has elapsed from the switching point of time yields a tendency of temperature change in the exposed cutting tool. Computing the temperature of the cutting tool at the switching point of time according to this tendency of change determines the two-dimensional temperature distribution of the cutting tool when the cutting tool is in contact with the material to be cut, i.e., during the cutting process. In particular, as the imaging means having an imaging optical system which is set such as to effect imaging at a focal length not shorter than 50 mm and a resolving power finer than 30 µm is provided, a captured image with a very high accuracy can be obtained.

In order to overcome the above-mentioned problems, the noncontact temperature distribution measuring apparatus in accordance with the present invention may be a noncontact temperature distribution measuring apparatus for measuring, from outside one of objects moving relative to each other, a two-dimensional temperature distribution of an inner face of the other object facing the one object, the apparatus comprising imaging means for capturing an exposed image of the inner face of the other object a plurality of times with an interval of a predetermined delay time through an opening portion formed in the one object; changing characteristic computing means for relating a plurality of image information items obtained upon a plurality of capturing operations effected by the imaging means, for each information item corresponding to an identical location of the exposed image, to an exposure time which has elapsed from a switching point of time when the inner face of the other object attains an exposed state through the opening portion from an unexposed state, so as to determine a tendency of change in the image information with respect to the exposure time; and temperature distribution computing means for computing the two-dimensional temperature distribution of the inner face of the other object at the switching point of time according to the tendency of change determined by the changing characteristic computing means.

Through the opening portion formed in one object, an image of the other object is captured, whereby the exposed image of the inner face of the other object can be captured regardless of the existence of the one object. As the exposed image of the inner face of the other object is captured a plurality of times with an interval of a predetermined delay time, image information of the exposed image can be obtained at each of thus delayed points of time. The resulting plurality of image information items include data of their locations corresponding the exposure time that has elapsed from the switching point of time when the inner face of the other object attains an exposed state through the opening portion from an unexposed state. Hence, the tendency of change in image information with respect to the exposure time is determined in relation to the latter, and the two-dimensional temperature distribution of the inner face of the other object at the switching point of time is computed according to this tendency of change, whereby the two-dimensional temperature distribution can be obtained.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 4 is a timing chart for explaining the principle of synchronizing an object to be measured and imaging-scanning with each other;

FIGS. 7A to 7C are explanatory views for explaining the principle of determining exposure time;

FIGS. 8A to 8E are explanatory views for explaining the principle of determining a temperature change curve;

FIGS. 17A to 17H are explanatory views for explaining images obtained upon imaging-scanning in synchronization with delay times;

FIGS. 20A to 20E is an explanatory view for explaining the principle of determining a temperature change curve;

FIGS. 21A to 21F are explanatory views for explaining the principle of image synthesizing processing;

DESCRIPTION OF THE PREFERRED EMBODIMENTS (1) Noncontact Temperature Distribution Measuring Apparatus in Accordance with First Embodiment of Present Invention The noncontact temperature distribution measuring apparatus in accordance with the first embodiment of the present invention will be explained with reference to the drawings. The apparatus in accordance with this embodiment is a noncontact temperature distribution measuring apparatus for measuring a two-dimensional temperature distribution of a cutting tool during a cutting process in a noncontact state.

Figure 1:
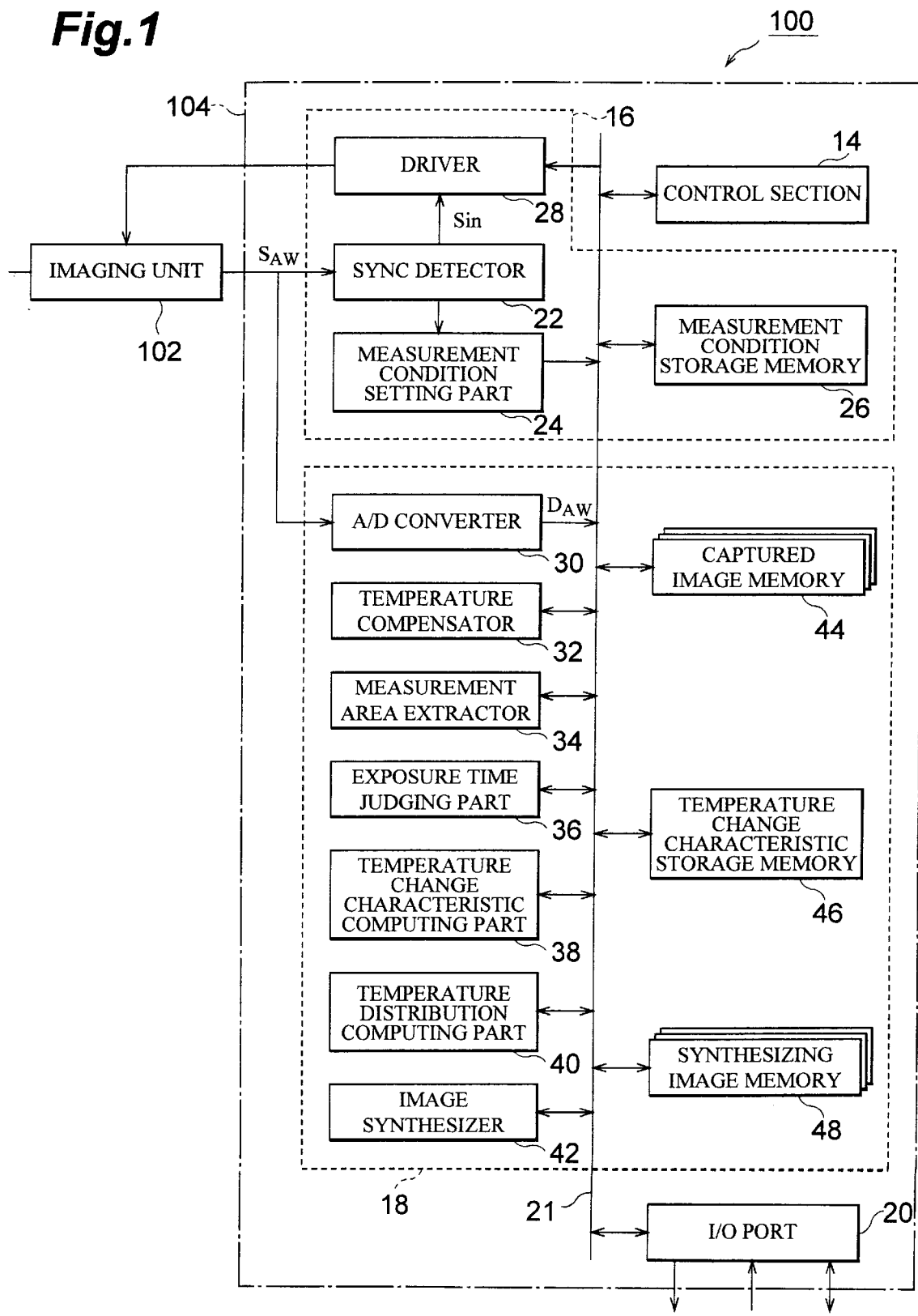
FIG. 1 is block diagram showing a configuration of a noncontact temperature distribution measuring apparatus.
Figure 2:
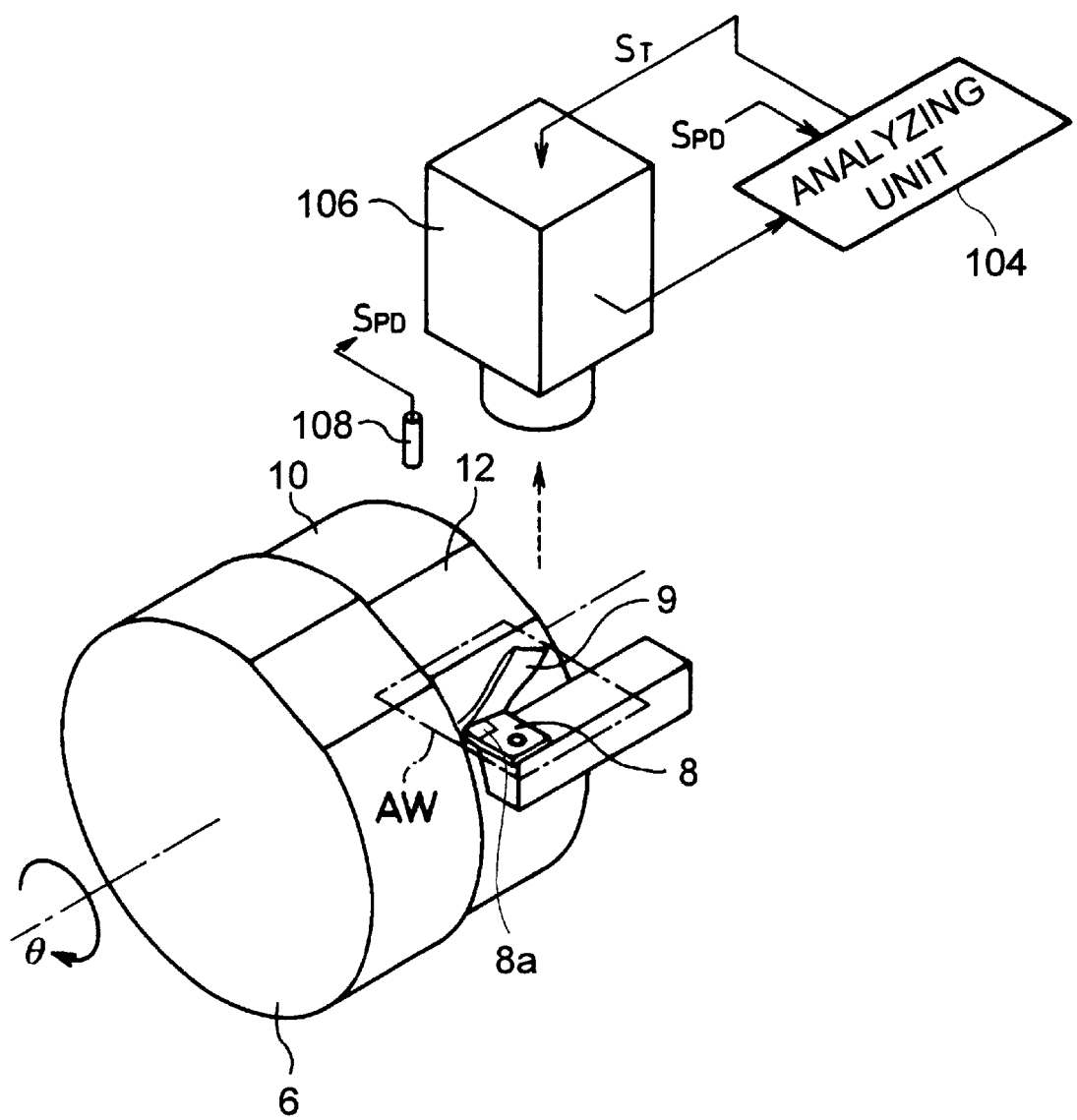
FIG. 2 is an explanatory view showing an example of modes of installation of the noncontact temperature distribution measuring apparatus.

FIG. 1 is a block diagram showing a configuration of the noncontact temperature distribution measuring apparatus in accordance with this embodiment, whereas FIG. 2 is a view showing an example of modes of installation of the noncontact temperature distribution measuring apparatus with respect to an object to be measured in accordance with this embodiment.

As shown in FIG. 1, the noncontact temperature distribution measuring apparatus 100 in accordance with this embodiment comprises an imaging unit 102 for capturing an object to be measured, and an analyzing unit 104 for analyzing an image signal $S_{AW}$ outputted from the imaging unit 102, so as to determine a two-dimensional temperature distribution of the object to be measured.

As shown in FIG. 2, the imaging unit 102 comprises a camera mechanism 106 for imaging with a two-dimensional imaging device, and a photosensor 108 made of a phototransistor or the like.

The camera mechanism 106 and the photosensor 108 are disposed at appropriate positions with respect to the object to be measured. For example, as shown in FIG. 2, when a two-dimensional temperature distribution is measured at the cutting edge and rake face 8a of a cutting tool 8 for cutting the peripheral side wall of a material to be cut 6 which rotates in a circumferential direction θ in the case where a cutting process is effected by use of various kinds of lathe machines, the camera mechanism 106 is disposed such that the cutting tool 8 to be measured is received within its capturable area (view area indicated by chain line AW), whereas the photosensor 108 is disposed so as to face the peripheral side wall of the material to be cut 6.

In order to prevent a chip 9 formed from the material to be cut 6 during the cutting process and the like from scattering over and contaminating the imaging surface of the camera mechanism 106, and so forth, the imaging optical system in the camera mechanism 106 is designed such as to yield optical characteristics with a focal length of 50 mm or longer and a resolving power of 30 $\mu$m or finer. Here, the resolving power refers to a limit of ability to reproduce a fine part and is defined, for example, as the minimum interval of black stripes at a limit point where a pattern of equidistant black-and-white stripes can be captured while they are separated from each other. More preferably, the focal length is set to 100 mm or longer, and the resolving power is set finer than 25 $\mu$m (resolving power $\leq$ 25 $\mu$m).

Further, employed as cutting state setting means for setting a substantial cutting period for bringing the material to be cut 6 and the cutting tool 8 into contact with each other and a substantial noncutting period for separating the material to be cut 6 and the cutting tool 8 from each other during the cutting process is the material to be cut 6 having a cutout 12 inside a surface 10 to be cut with the cutting tool 8. Hence, as the material to be cut 6 rotates in a circumferential direction $\theta$, the cutting tool 8 is separated from the material to be cut 6 when passing over the cutout 12, whereby the cutting process is temporarily stopped, thus exposing the cutting edge and rake face 8a of the cutting tool 8.

Figure 3:
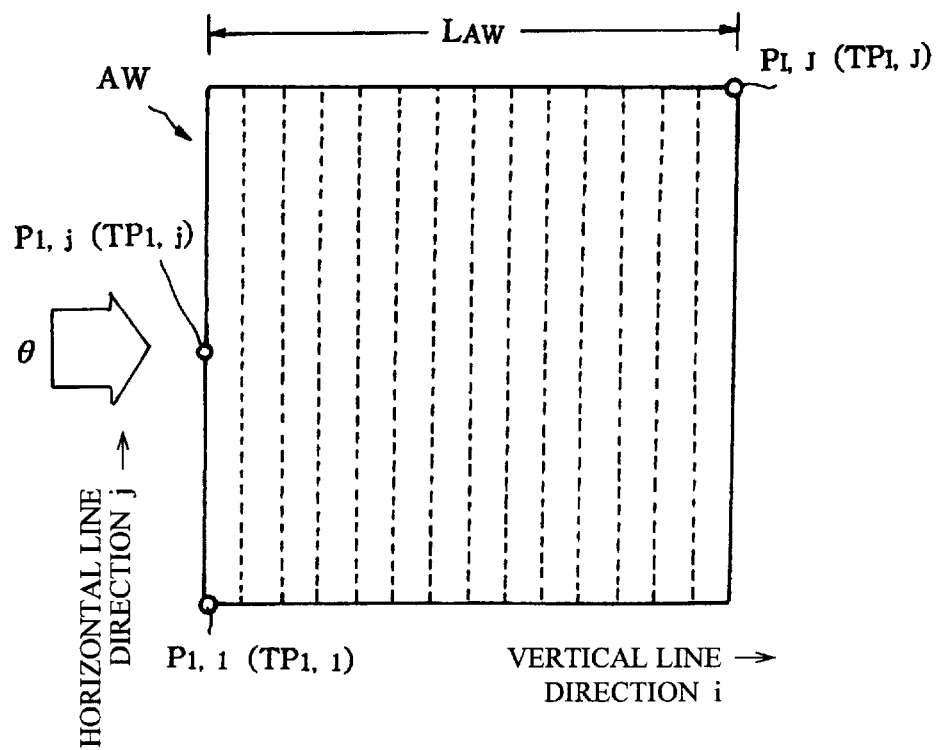
FIG. 3 is an explanatory view for explaining the principle of imaging-scanning.
Figure 5A:
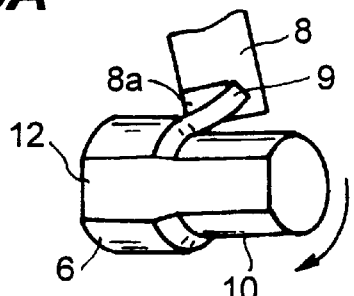
FIGS. 5A to 5J are explanatory views for explaining images obtained upon imaging-scanning in synchronization with delay times.
Figure 5B:
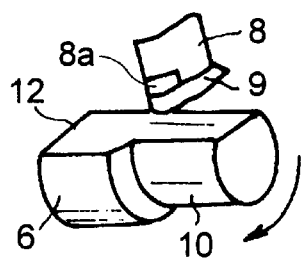
Figure 5C:
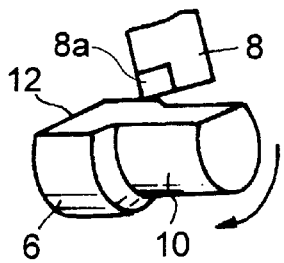
Figure 5D:
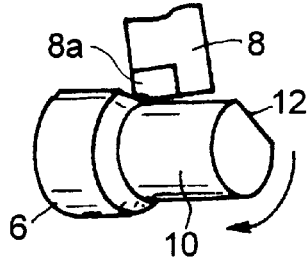
Figure 5E:
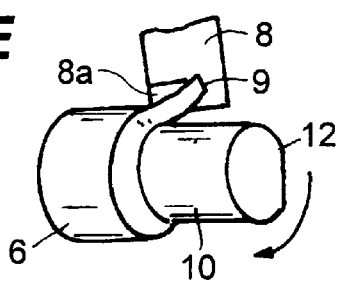
Figure 5F:
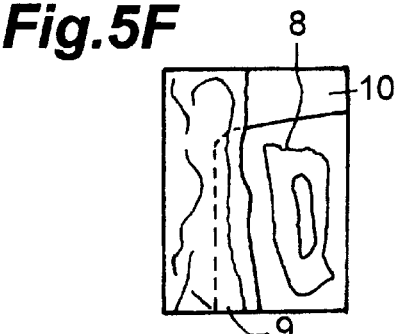
Figure 5G:
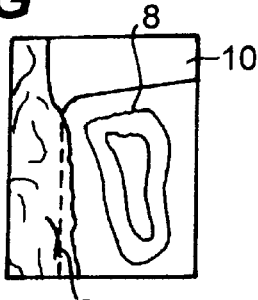
Figure 5H:
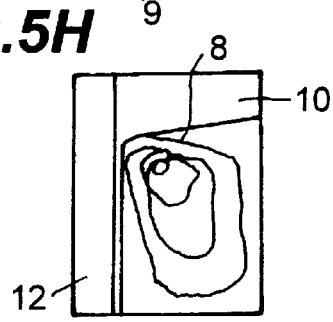
Figure 5I:
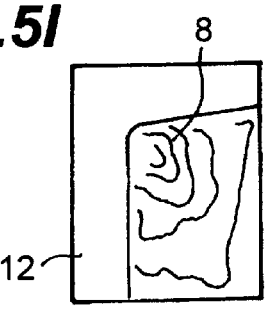
Figure 5J:
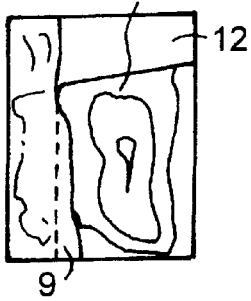

As shown in FIG. 3, the camera mechanism 106 is disposed such that the horizontal line direction j of the two-dimensional imaging device which is included in the camera mechanism 106 and the rotating direction (circumferential direction) $\theta$ of the material to be cut 6 are substantially orthogonal to each other. As a consequence, the material to be cut 6 moves within the capturable area AW along the vertical line direction i from the first horizontal line (i=1).

The cutout 12 may have any form or size. It is essentially sufficient for the cutout 12 to have such a form as to yield a state in which the cutting tool 8 is separated from the material to be cut 6 during the cutting process, thereby substantially preventing it from being subjected to the cutting process.

In FIG. 1, the analyzing unit 104 comprises a control section 14 including a microprocessor (MPU) or the like having an arithmetic control function and controlling the operation of the whole analyzing unit 104; an imaging control section 16 for controlling the capturing operation of the camera mechanism 106; an image processing section 18 for determining a two-dimensional temperature distribution of a surface of the cutting tool 8 according to the image signal $S_{AW}$ outputted from the camera mechanism 106; and an I/O port 20 for connecting with external devices such as an external display, an external storage device, a keyboard, and the like. The control section 14, imaging control section 16, image processing section 18, and I/O port 20 are connected to each other through a so-called bus line 21.

The imaging control section 16 comprises a synchronization detector 22, a measurement condition setting part 24, a measurement condition storage memory 26, and a driver 28.

According to changes in amplitude of a photo-detection signal $S_{PD}$ outputted from the photosensor 108 while the material to be cut 6 is rotating, the synchronization detector 22 detects a point of time (hereinafter referred to as first synchronization point of time) $t_F$ at which the surface to be cut 10 changes to the cutout 12 and a point of time (hereinafter referred to as second synchronization point of time) $t_E$ at which the cutout 12 changes to the surface to be cut 10.

FIG. 4 is a timing chart showing operations of the timing detector 22 for detecting the first synchronization point of time $t_F$ and second synchronization point of time $t_E$. In FIG. 4, the amplitude of the photo-detection signal $S_{PD}$ outputted from the photosensor 108 changes depending on whether light is received from the surface to be cut 10 or from the cutout 12. Subjecting the photo-detection signal $S_{PD}$ to differential processing yields a pulse-shaped differential waveform signal $\Delta S_{PD}$. Further formed are a first synchronization signal Sout which becomes logical "H" at the point of time when the pulse waveform on the minus side of the differential waveform signal $\Delta S_{PD}$ exceeds a predetermined threshold THD2, and a second synchronization signal Sin which becomes logical "H" at the point of time when the pulse waveform on the plus side of the differential waveform signal $\Delta S_{FD}$ exceeds a predetermined threshold THD1. Then, the point of time when the first synchronization signal Sout becomes logical "H" is judged to be the first synchronization point of time $t_F$, and the point of time when the second synchronization signal Sin becomes logical "H" is judged to be the second synchronization point of time $t_E$.

According to the first and second synchronization point of time $t_F$, $t_E$ set by the first and second synchronization signals Sout, Sin, the measurement condition setting part 24 determines the time $T_0$ required for the material to be cut 6 to make one revolution, the rotational speed V of the material to be cut 6, the passing time $T_W$ required for the cutout 12 to pass through the front side of the photosensor 108, the passing time $T_S$ required for the surface to be cut 10 to pass through the front side of the photosensor 108, the width W of the cutout 12 in the circumferential direction $\theta$, and the like.

Further, the period required for the cutting tool 8 to pass over the cutout 12 (i.e., $T_W$) is divided by the number of frames N to be captured in this period $T_W$, so as to determine a basic delay time $\Delta(=T_W/N)$ which forms a basis for shutter timings. Here, an operator can arbitrarily set the number of frames N. The measurement condition data $T_0$, V, $T_W$, $T_S$, W, N, $\Delta$ determined by the measurement condition setting part 24 are stored in the measurement condition storage memory 26, and are utilized when the image processing section 18, which will be explained later, computes a two-dimensional temperature distribution.

Whenever the point of time (first synchronization point of time) $t_F$ at which the first synchronization signal Sout outputted from the synchronization detector 22 becomes logical "H" is detected, the driver 28 supplies a shutter signal $S_T$ to the camera mechanism 106 at the point of time when a delay time $\tau m$ (=$T_S$+m$\Delta$) obtained by adding an integral multiple m of the basic delay time $\Delta$ to the time $T_S$ has elapsed. Here, the time $T_S$ is an offset period from when the photosensor 108 detects the point of time $t_E$ until the cutting tool 8 enters the cutout 12. Namely, the time $T_S$ is determined by dividing the offset distance between the photosensor 108 and the cutting tool 8 by the rotational speed V of the material to be cut 6.

When the delay time $\tau m$ reaches the time $T_S$+N×$\Delta$, the delay time $\tau m$ is reset so as to gradually increase from the basic delay time $\Delta$ again, whereby a process for setting the shutter timing for the camera mechanism 106 is repeated with thus increased delay time.

As the camera mechanism 106 is caused to effect the capturing operation while the delay time τm is thus variably controlled, obtained are images such as those shown in FIGS. 5F to 5J respectively corresponding to the relative positional relationships between the material to be cut 6 and the cutting tool 8 shown in FIGS. 5A to 5E.

In FIG. 1, the image processing section 18 comprises an A/D converter 30, a temperature compensator 32, a measurement area extractor 34, an exposure time judgment part 36, a temperature change characteristic computing part 38, a temperature distribution computing part 40, an image synthesizer 42, a captured image memory 44, a temperature change characteristic memory 46, and a synthesizing image memory 48.

For each delay time τm mentioned above, the A/D converter 30 converts the image signal $S_{AW}$ captured by the camera mechanism 106 and outputted therefrom into digital image data $D_{AW}$, which are then stored into the captured image memory 44 as a frame image file related to each delay time τm.

The temperature compensator 32 converts the digital image data $D_{AW}$ indicative of a luminance component stored in the captured image memory 44 into digital image data $TD_{AW}$ indicative of a temperature component (hereinafter referred to as temperature image data). Then, the temperature image data $TD_{AW}$ are stored again into the captured image memory 44 as a frame image file related to each delay time τm. Here, by applying the following Stefan-Boltzmann equation (1) to each pixel data $P_{i,j}$ (where $1 \leq i \leq I$, $1 \leq j \leq J$) constituting the digital image data $D_{AW}$, the temperature image data $TD_{AW}$ of the temperature component are determined:

$$\omega = \epsilon \sigma T^4 \qquad (1)$$

where ω is infrared energy (corresponding to the luminance of each pixel data $P_{i,j}$), T is the absolute temperature of the object (corresponding to each temperature pixel data $TP_{i,j}$), ε is emissivity (ε≦1), and σ is a Stefan-Boltzmann constant).

From a plurality of frame images of temperature image data $TD_{AW}$ stored in the captured image memory 44, the measurement area extractor 34 extracts temperature image data $TR_B$ which correspond to the period in which the cutting tool 8 substantially does not effect the cutting process, and stores thus extracted data into the synthesizing image memory 48. Namely, of the temperature image data $TD_{AW}$, extracted are not the image data in which the cutting edge and rake face 8a of the cutting tool 8 are hidden by the chip 9 formed during the cutting process but the temperature image data $TR_B$ obtained when the cutting tool 8 passes over the cutout 12 of the material to be cut 8 such that the cutting is not substantially effected. Upon this processing, the temperature image data $TR_B$ indicating the image of the exposed cutting tool 8 not obstructed by the chip 9 are extracted.

Figure 6A:
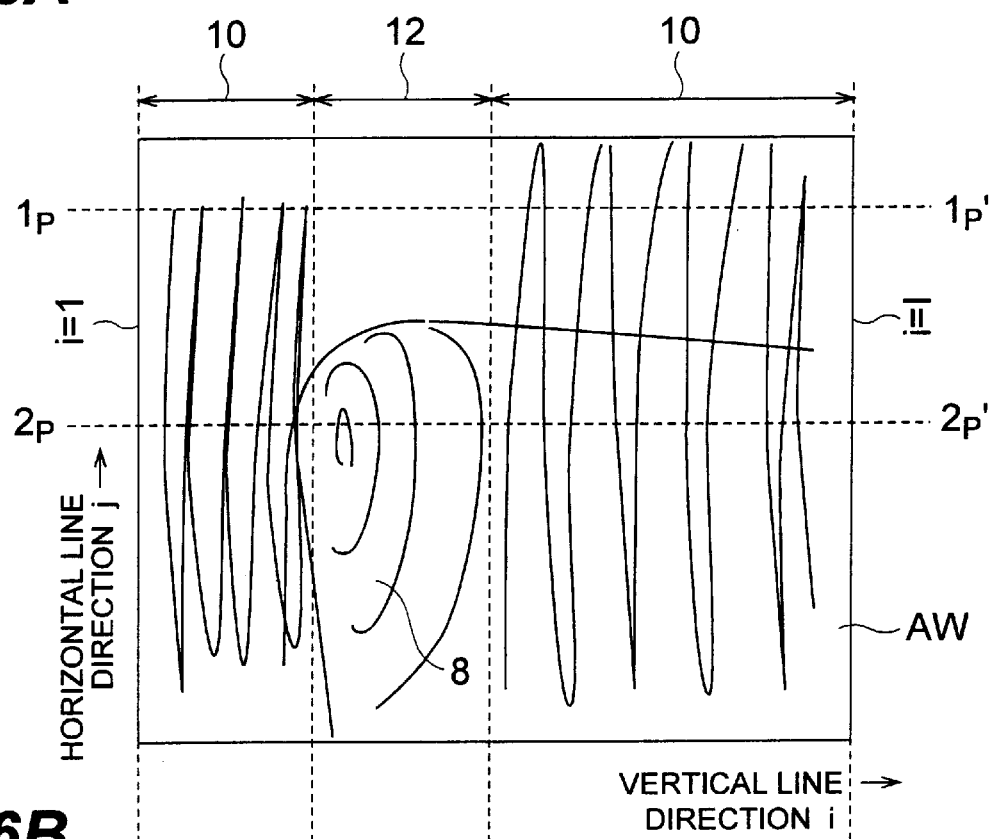
FIGS. 6A and 6B are explanatory views for explaining the principle of extracting image data of an exposed face.
Figure 6B:
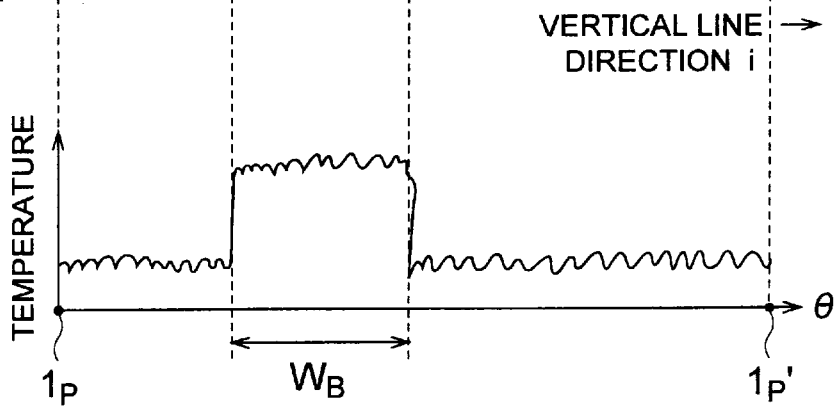

FIGS. 6A and 6B are views showing the principle of extracting the temperature image data $TR_B$. For temperature image data $TR_{AW}$ of each frame image file such as those shown in FIG. 6A, a temperature change distribution of temperature pixel data which are obtained from pixel groups (e.g., the pixel group on the 1p—1p' line and the pixel group on the 2p—2p' line in FIG. 6A) along the vertical line direction i of the two-dimensional imaging device is studied.

From the change in temperature image data of the pixel group on the 1p—1p' line such as that shown in FIG. 6B, an area $W_B$ of the cutout 12 is detected. In the case where the temperature image data corresponding to the cutting tool 8 exist within this area $W_B$, these temperature image data $TR_{AW}$ are extracted therefrom, whereby the pixel temperature data $TR_B$ indicative of the cutting tool 8 not hidden by the chip 9 are obtained.

Alternatively, after the area $W_B$ of the cutout 12 is detected as mentioned above, only the temperature image data $TR_{AW}$ existing within this area $W_B$ may be extracted, so as to eliminate the temperature image data corresponding to the surface to be cut 10 and the like and yield the pixel temperature data $TR_B$ indicative of the cutting tool 8 not hidden by the chip 9.

According to each temperature image data $TR_B$, the exposure time judging part 36 computes the time (hereinafter referred to as exposure time) τ that has elapsed from the point of time (instant) when each location of the cutting tool 8 hidden by the chip 9 attains an exposed state by passing over the cutout 12 until thus exposed location is captured by the camera mechanism 106.

With reference to FIGS. 3 and 7A to 7C, the principle of computing this exposure time τ will be explained. As explained in conjunction with FIG. 3, the image of the material to be cut 6 moves along the vertical line direction i of the two-dimensional imaging device incorporated in the camera mechanism 106. As a consequence, the cutting tool 8 relatively moves in the direction opposite to the material to be cut 6. Due to this relationship, as shown in FIGS. 7A to 7C, the exposure timer becomes longer in the location farther from a front edge portion E of the cutout 12. For example, the exposure time τ in the same specific location x shown in FIGS. 7A to 7C gradually becomes longer from FIG. 7A to FIG. 7C.

Therefore, as shown in FIGS. 7A to 7C, a plurality of temperature image data $TR_B(1)$ to $TR_B(N)$ having the temperature pixel data $TP_{i,j}$ of the specific location x are read out from the synthesizing image memory 48, and detected in the temperature image data $TR_B(1)$ to $TR_B(N)$ are horizontal lines $I_E(1)$ to $I_E(N)$ which correspond to the front edge portion E of the cutout 12 and horizontal lines $I_F(1)$ to $I_F(N)$ where the temperature pixel data $TP_{i,j}$ corresponding to the specific location x are positioned. Further, the numbers of the horizontal lines $I_F(1)-I_E(1), \ldots, I_F(N)-I_E(N)$ existing between the horizontal lines $I_E(1), \ldots, I_E(N)$ and $I_F(1), \ldots, I_F(N)$, respectively, are calculated. Then, these numbers of the horizontal lines $I_F(1)-I_E(1), \ldots, I_F(N)-I_E(N)$ are multiplied by the time δ required for the cutout 12 to pass over one horizontal line span of the two-dimensional imaging device, whereby the exposure times τ(1) to τ(N) of the specific location x are determined.

Namely, the exposure time τ(1) of the temperature pixel data $TP_{i,j}$ in the temperature image data $TR_B(1)$ shown in FIGS. 7A to 7C becomes $\tau(1)=(I_F(1)-I_E(1))\times\delta$, the exposure time τ(2) of the temperature pixel data $TP_{i,j}$ in the temperature image data $TR_B(2)$ becomes $\tau(2)=(I_F(2)-I_E(2))\times\delta$, and, successively in a similar manner, the exposure time τ(N) of the temperature pixel data $TP_{i,j}$ in the temperature image data $TR_B(N)$ becomes $\tau(N)=(I_F(N)-I_E(N))\times\delta$. Also, the exposure time τ of the remaining temperature pixel data is determined similarly.

Here, the time δ is determined by the relational expression of $\delta=L_{AW}/(I\times V)$ according to the rotational speed V of the material to be cut 8 and the length $L_{AW}$ of the capturable area AW in the circumferential direction θ and the total number of horizontal lines I of the two-dimensional imaging device.

For a plurality of files of temperature image data $TR_B$ stored in the synthesizing image memory 48, the temperature change characteristic computing part 38 arranges the pixel data $TP_{i,j}$ corresponding to the same location of the cutting tool 8 along the exposure times $\tau(1)$ to $\tau(N)$, thereby estimating and computing a temperature characteristic curve $CP_{i,j}$ indicative of the tendency of temperature change after this location is exposed.

Figure 8B:
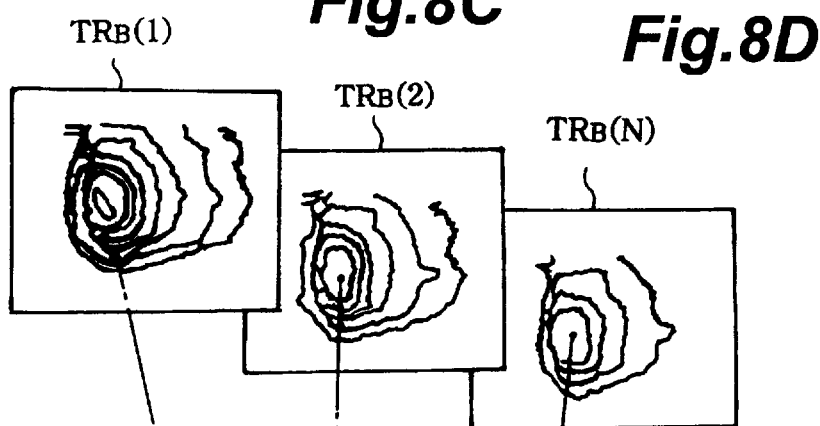

FIGS. 8A to 8E representatively show the principle of computing a temperature characteristic curve $CP_{i,j}$ concerning the temperature pixel data $TP_{i,j}$ corresponding to a certain specific location of the cutting tool 8. In FIG. 8A, temperature pixel data $TP_{i,j}(1)$ to $TP_{i,j}(N)$ are read out from the temperature image data $TR_B(1)$ to $TR_B(N)$ (These are shown in FIGS. 8B to 8D) and are arranged along the respective exposure times $\tau(1)$ to $\tau(N)$. Statistical processing such as curve fitting or method of least squares, neural network technique, or the like is used for estimating and computing the temperature characteristic curve $CP_{i,j}$ indicative of the tendency of change in the temperature pixel data $TP_{i,j}(1)$ to $TP_{i,j}(N)$. Also, similar estimating and computing operations are carried out for the remaining locations of the cutting tool 8, whereby the temperature characteristic curves $CP_{i,j}$ for all the locations are determined, and thus determined data are stored into the temperature change characteristic storage memory 46.

According to the data of the temperature characteristic curves $CP_{i,j}$ stored in the temperature change characteristic storage memory 46, the temperature distribution computing part 40 estimates and computes a temperature distribution $TP_{i,j}(t_r)$ at an instant $t_r$ when each location of the cutting tool 8 has attained an exposed state, and data of thus computed result are stored into the synthesizing image memory 48 again. The instant $t_r$ when each location of the cutting tool 8 has attained an exposed state is determined from positional information of horizontal lines $I_E(1)$ to $I_E(N)$ which correspond to the front edge portion E of the cutout 12 shown in FIGS. 7A to 7C.

Figure 8E:
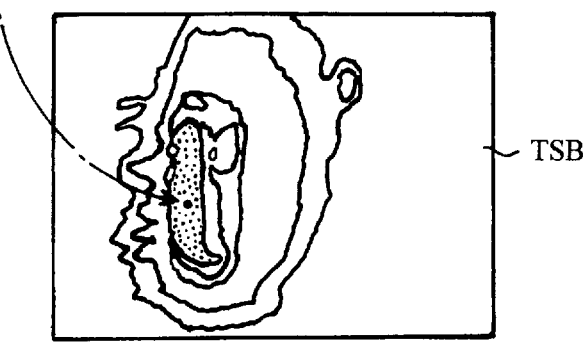

The image synthesizer 42 interpolates the data lacking portions in the temperature distribution $TP_{i,j}(t_r)$ stored in the synthesizing image memory 48 according to statistical processing, thereby forming two-dimensional temperature distribution data TSB indicative of a two-dimensional temperature distribution of the whole surface of the cutting tool 8 as shown in FIG. 8E, which are then stored into the synthesizing image memory 48. Also, the two-dimensional temperature distribution data TSB are processed so as to be stored into an external storage device, reproduced and displayed on an external monitor, printed as a hard copy, and so forth by way of the I/O port 20.

Figure 9:
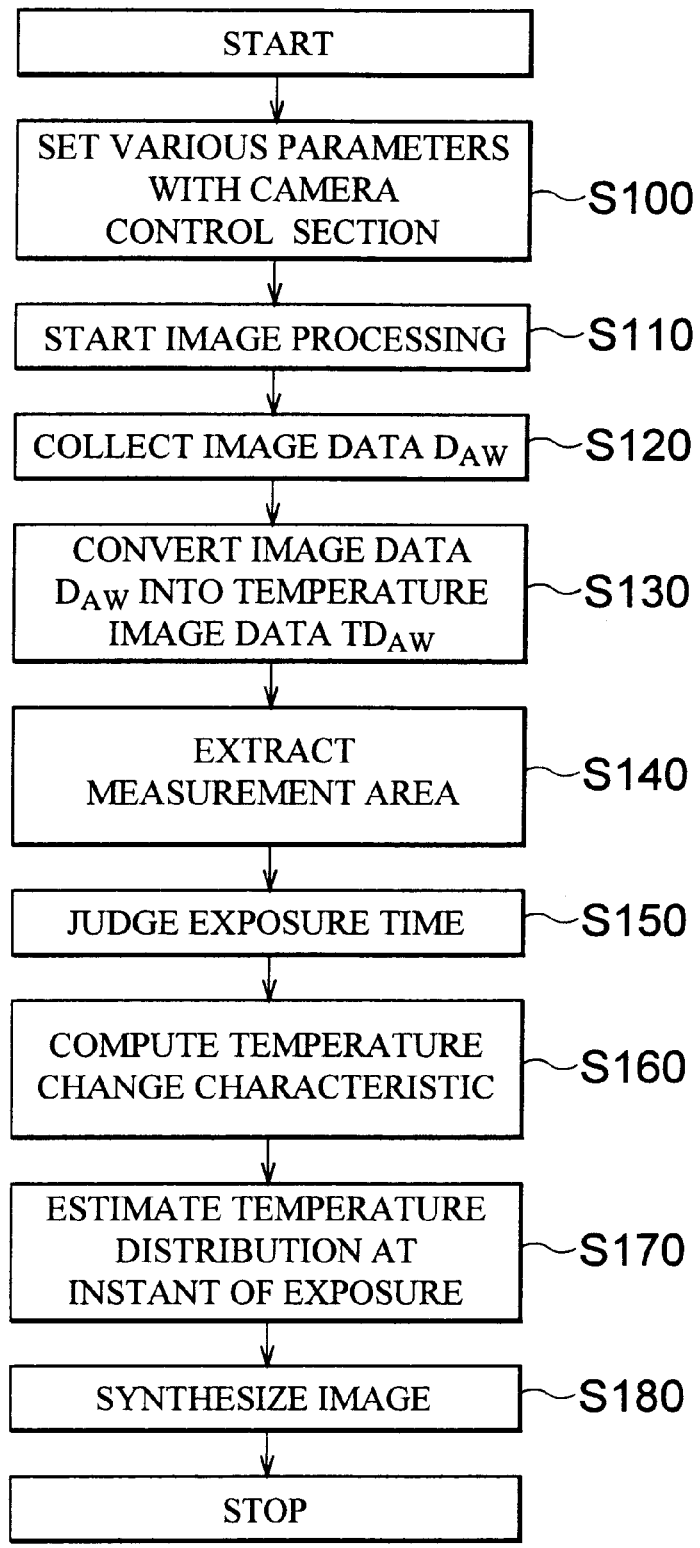
FIG. 9 is a flow chart for explaining a series of operations until a two-dimensional temperature distribution is determined by the noncontact temperature distribution measuring apparatus.

A series of operations of this noncontact temperature distribution measuring apparatus will now be explained with reference to the flowchart shown in FIG. 9.

As the noncontact temperature distribution measuring apparatus 100 is started, the image control section 16 is actuated at step S100, whereby, while the material to be cut 6 makes 5 to 10 revolutions, the synchronization detector 22 and the measurement condition setting part 24 determine various kinds of measurement conditions such as the above-mentioned basic delay time $\Delta$, rotational speed V of the material to be cut 6, and the like according to the photo-detection signal $S_{PD}$ of the photosensor 108. During this processing, the image processing section 18 does not carry out the processing for determining a two-dimensional temperature distribution, but the image signal $S_{AW}$ is simply transferred to an external display or the like by way of the A/D converter 30 and I/O port 20.

After the above-mentioned various kinds of measurement conditions are determined, the flow proceeds to step S110, where the image processing section 18 is actuated. First, at step S120, the image signal $S_{AW}$ outputted from the camera mechanism 106 in synchronization with the delay time $\tau m$ set by the driver 28 is converted into digital image data $D_{AW}$ by the A/D converter 30, which are then stored into the captured image memory 44. Here, the imaging processing is carried out until a number of frame images of digital image data $D_{AW}$ sufficient for determining a two-dimensional temperature distribution of the surface of the cutting tool 8 are collected.

After sufficient digital image data $D_{AW}$ are collected, at step S130, the temperature compensator 32 converts the digital image data $D_{AW}$ of a luminous component into temperature image data $TD_{AW}$ of a temperature component. Then, at step S140, the measurement area extractor 34 extracts temperature image data $TR_B$ concerning the exposed face of the cutting tool 8 from the temperature image data $TD_{AW}$. Subsequently, at step S150, the exposure time judging part 36 determines the exposure time $\tau$ of each location of the exposed face according to the temperature image data $TR_B$. Then, at step S160, the temperature change characteristic computing part 38 determines the temperature characteristic curve $CP_{i,j}$ at each location of the exposed face.

At step S170, according to the above-mentioned temperature characteristic curve $CP_{i,j}$, the temperature distribution computing part 40 computes the two-dimensional temperature distribution data TSB at the instant $t_r$ when the cutting tool 8 is exposed. Then, at step S180, the image synthesizer 42 interpolates the lacking data portions in the two-dimensional temperature distribution data TSB, thereby yielding two-dimensional temperature distribution data TSB indicative of the whole two-dimensional temperature distribution of the cutting tool 8, thus completing the series of processing operations.

Hence, since the noncontact temperature distribution measuring apparatus 100 in accordance with this embodiment measures a temperature distribution at the time when the cutting tool 8 passes over the cutout 12, and determines, according to thus measured temperature distribution data, a two-dimensional temperature distribution at the time when the cutting tool 8 cuts the surface to be cut 10, it can measure the two-dimensional temperature distribution of the cutting tool 8 with a high accuracy even when the cutting tool 8 is hidden by the chip 9 during the cutting process.

Though the foregoing explanation relates to a configuration in which the imaging control section 16 is provided with the measurement condition setting part 24, which automatically determines the above-mentioned measurement conditions, the present invention should not be restricted to such a configuration. For example, in the case where the above-mentioned measurement conditions such as rotational speed V, basic delay time $\Delta$, and the like have been known, these measurement condition data may be stored into the measurement condition storage memory 26 beforehand by way of the I/O port 20. In this case, the measurement condition setting part 24 can be omitted.

In the case where the materials of the material to be cut 6 and cutting tool 8 and the temperature change characteristic at the time when the cutting tool 8 attains an exposed state have already been known, the data of temperature characteristic curve $CP_{i,j}$ may be stored into the temperature change characteristic storage memory 46 by way of the I/O port 20. In this case, the exposure time judging part 36 and the temperature change characteristic computing part 38 may be omitted. When the data of temperature characteristic curve $CP_{i,j}$ are stored into the temperature change characteristic storage memory 46, the temperature distribution $TP_{i,j}(t_r)$ at the instant $t_r$ when each location of the cutting tool has attained an exposed state can be computed by simply applying to the data of temperature characteristic curve $CP_{i,j}$ one frame image of digital image data $D_{AW}$ obtained when the cutting tool 8 has attained an exposed state. As a consequence, the processing time for collecting the digital image data $D_{AW}$ (time required for imaging) can be shortened, thus making it possible to measure a two-dimensional temperature distribution more rapidly.

When the basic delay time Δ is made equal to a so-called frame period which has already been set in the camera mechanism 106, the imaging control section 16 may be omitted. Namely, the synchronization detector 22, measurement condition setting part 24, measurement condition storage memory 26, and driver 28 in the imaging control section 16 shown in FIG. 1 may be omitted, and the above-mentioned image processing may be carried out in the image processing section 18 while employing this frame period as the basic delay time Δ, so as to determine a two-dimensional temperature distribution. In this case, the photosensor 108 may be omitted as well.

Though a configuration in which the camera mechanism 106 equipped with a two-dimensional imaging device carries out plane-sequential imaging has been explained, a configuration for effecting line-sequential imaging or dot-sequential imaging may be employed as well.

Figure 10:
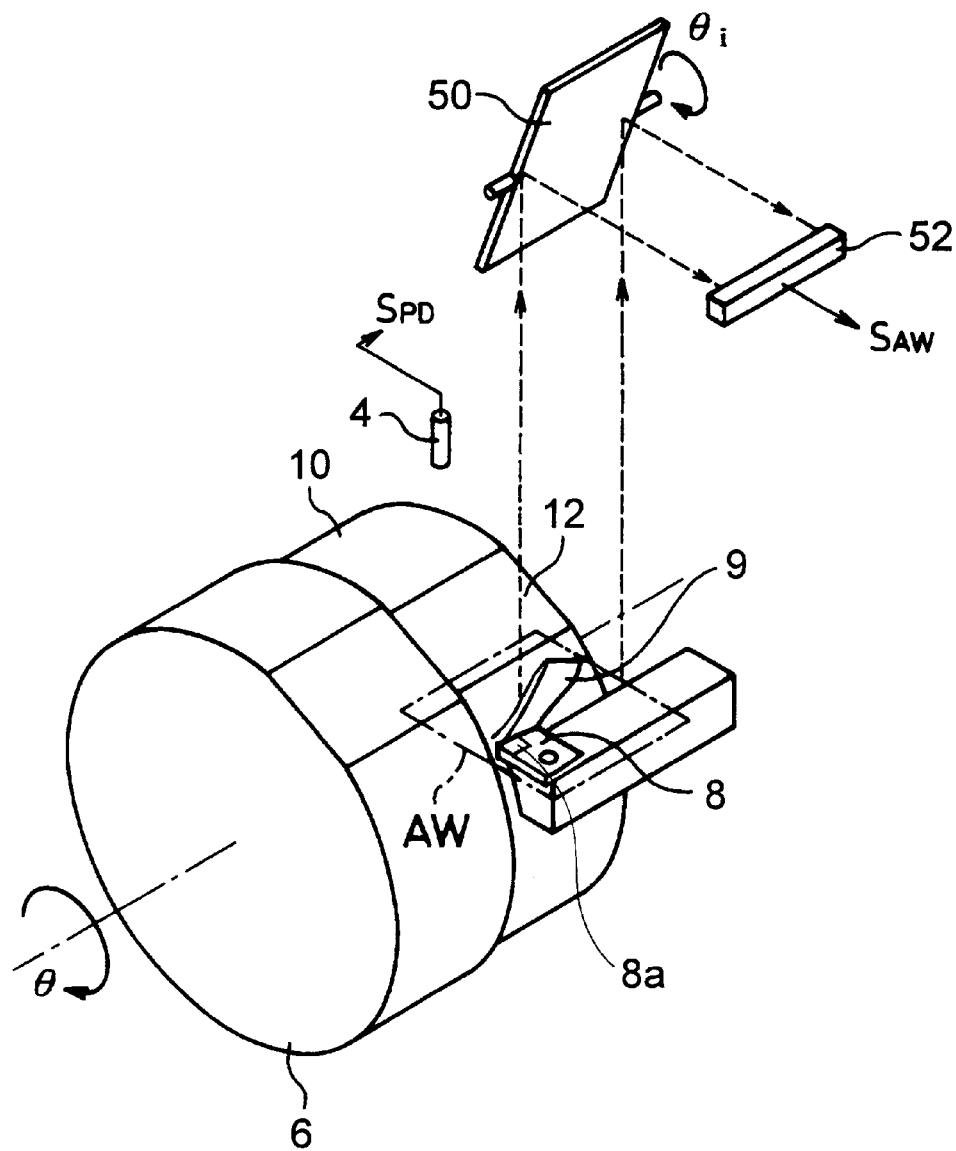
FIG. 10 is an explanatory configurational view showing a modified example of an imaging unit.

FIG. 10 shows a configurational example of a camera mechanism for effecting line-sequential imaging. Disposed in FIG. 10 are a rotary mirror 50 facing the material to be cut 6 and constantly rotating at a predetermined angular velocity of $Δ_i$ in a direction $θ_i$ which is identical to the rotating direction θ of the material to be cut 6, and a line sensor 52 for receiving a light image reflected by the rotary mirror 50, whereas the image signal $S_{AW}$ outputted from the line sensor 52 is supplied to the A/D converter 30 in FIG. 1. The image signal $S_{AW}$ is turned into digital image data $D_{AW}$ in frame image units, which are then taken into the captured image memory 44. As the digital image data $D_{AW}$ are subjected to the above-mentioned image processing in the image processing section 18, a two-dimensional temperature distribution can be determined.

Figure 11:
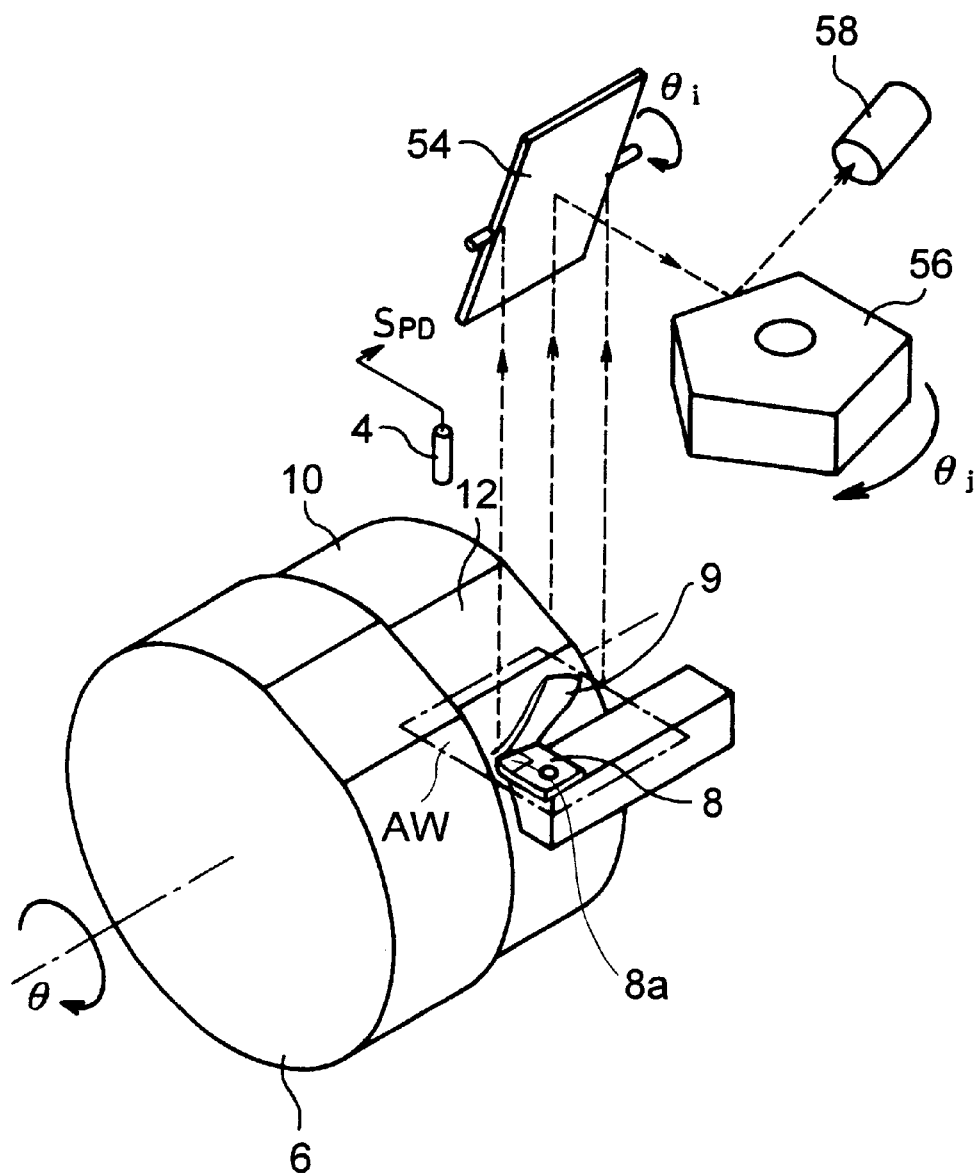
FIG. 11 is an explanatory configurational view showing another modified example of the imaging unit.

FIG. 11 shows a configurational example of a camera mechanism for effecting dot-sequential imaging. Disposed in FIG. 11 are a rotary mirror 54 facing the material to be cut 6 and constantly rotating at a predetermined angular velocity of Δi in a direction $θ_i$ which is identical to the rotating direction θ of the material to be cut 6, a polygon mirror 56 constantly rotating at a predetermined angular velocity of $Δ_j$ in a direction $θ_j$ which is orthogonal to the rotating direction $θ_i$ of the rotary mirror 54, and a light-receiving device 58 such as a phototransistor for receiving the light reflected by the polygon mirror 56, whereas the image signal $S_{AW}$ outputted from the light-receiving device 58 is supplied to the A/D converter 30 in FIG. 1. The image signal $S_{AW}$ is turned into digital image data $D_{AW}$ in frame image units, which are then taken into the captured image memory 44. As the digital image data $D_{AW}$ are subjected to the above-mentioned image processing in the image processing section 18, a two-dimensional temperature distribution can be determined.

Thus, a configuration for effecting line- or dot-sequential imaging-scanning can realize a camera mechanism less expensive than that obtained by a configuration for effecting plane-sequential imaging.

Though the foregoing explanation relates to a mode of usage in which the cutting tool 8 cuts the outer peripheral surface of the material to be cut 6, the apparatus is applicable to other modes of usage as well.

Figure 12:
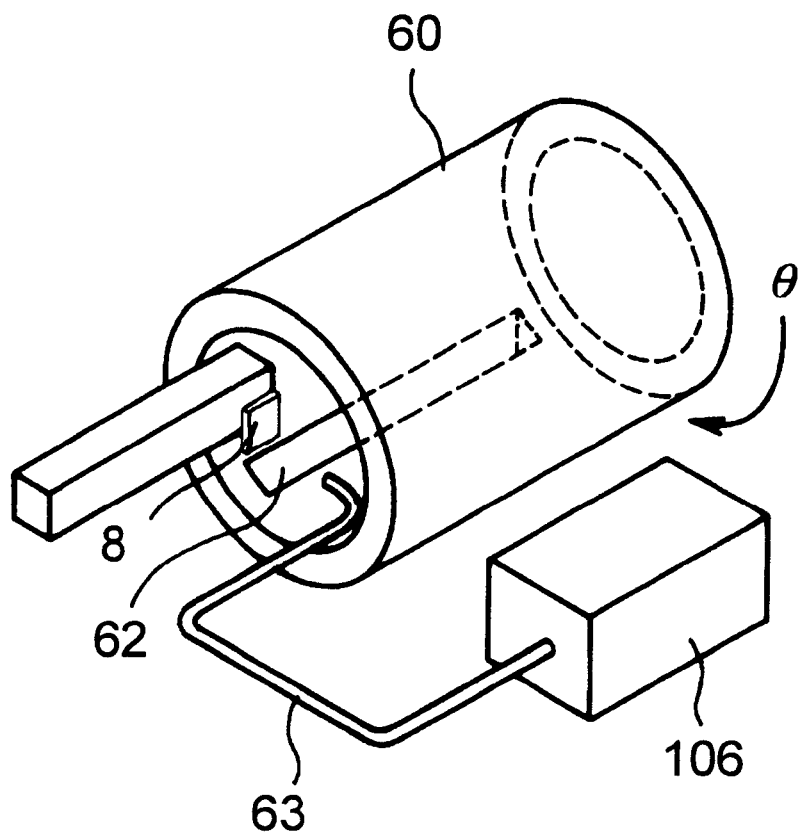
FIG. 12 is an explanatory view for explaining another applied example of the noncontact temperature distribution measuring apparatus.

FIG. 12 shows a case where various kinds of lathe machines are used such that a cutting tool 8 cuts the inner side wall of a cylindrical material to be cut 60 which rotates in a circumferential direction θ.

In this case, a part of the inner side wall of the material to be cut 60 is formed with a cutout 62 made of a slit-shaped recess or through hole beforehand, such that the cutting tool 8 temporally attains an exposed state when passing over the cutout 62. The cutting tool 8 attaining the exposed state is captured by the camera mechanism 106, and is subjected to image processing in the image processing section 18, whereby a two-dimensional temperature distribution during the cutting process with the cutting tool 8 can be measured.

As shown in FIG. 12, a thin optical fiber 63 may be disposed so as to extend from the camera mechanism 106, such that the image of the cutting tool 8 is introduced from the tip portion (light entrance end) of the optical fiber 63 so as to be captured by an imaging device. When the optical fiber 63 is thus provided, a two-dimensional temperature distribution in the cutting tool can be measured in the case where a thin part is subjected to a cutting process or where a part having a complicated structure is subjected to a cutting process.

(2) Noncontact Temperature Distribution Measuring Apparatus in Accordance with Second Embodiment of Present Invention The noncontact temperature distribution measuring apparatus in accordance with the second embodiment of the present invention will be explained with reference to the drawings. Constituents identical or equivalent to those of the noncontact temperature distribution measuring apparatus in accordance with the above-mentioned first embodiment will be referred to with numerals identical thereto. The noncontact temperature distribution measuring apparatus in accordance with the second embodiment is a noncontact temperature distribution measuring apparatus for measuring in a noncontact fashion, from outside one of objects moving relative to each other, a two-dimensional temperature distribution of an inner face of the other object.

Figure 13:
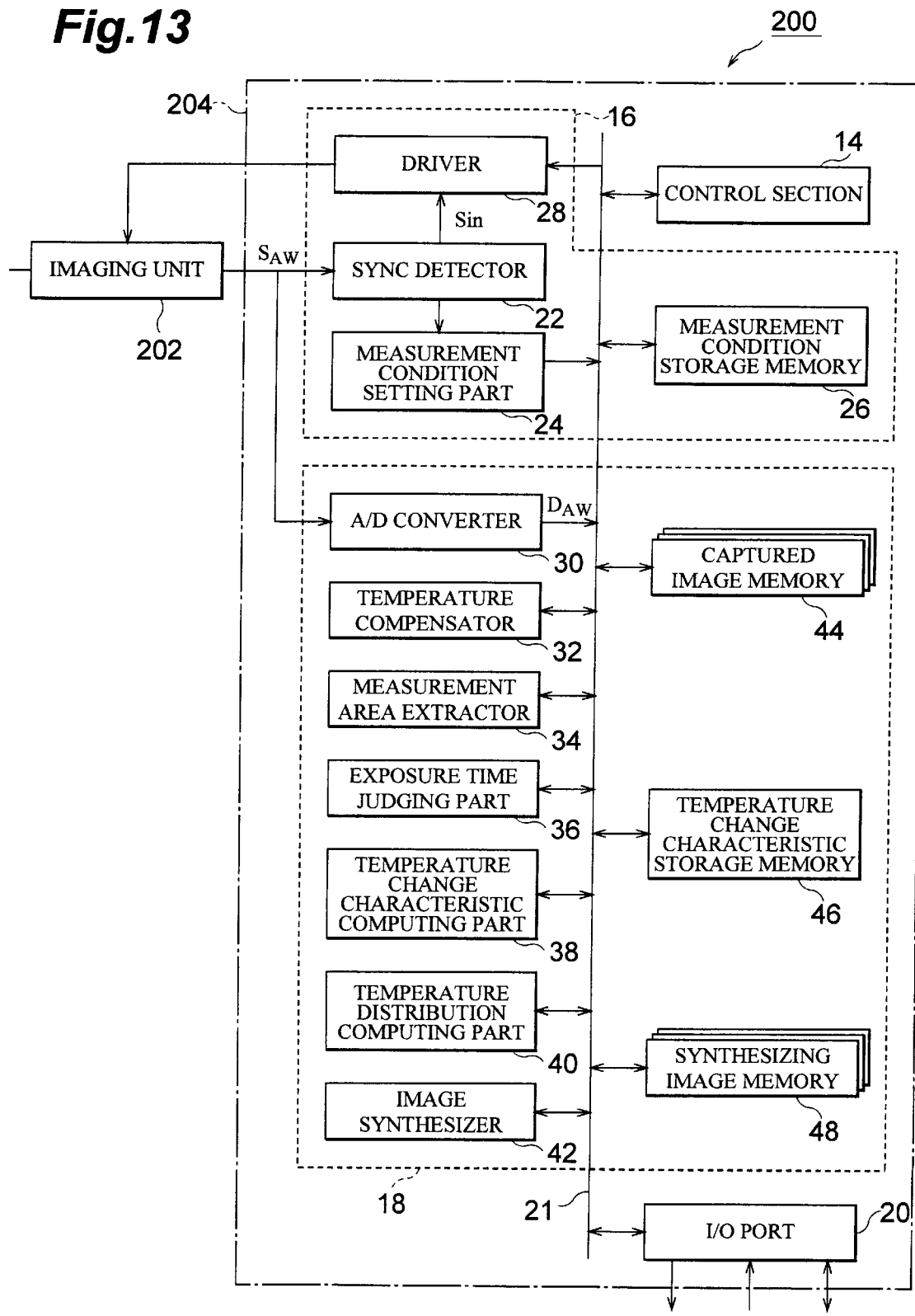
FIG. 13 is a block diagram showing a configuration of the noncontact temperature distribution measuring apparatus.
Figure 14A:
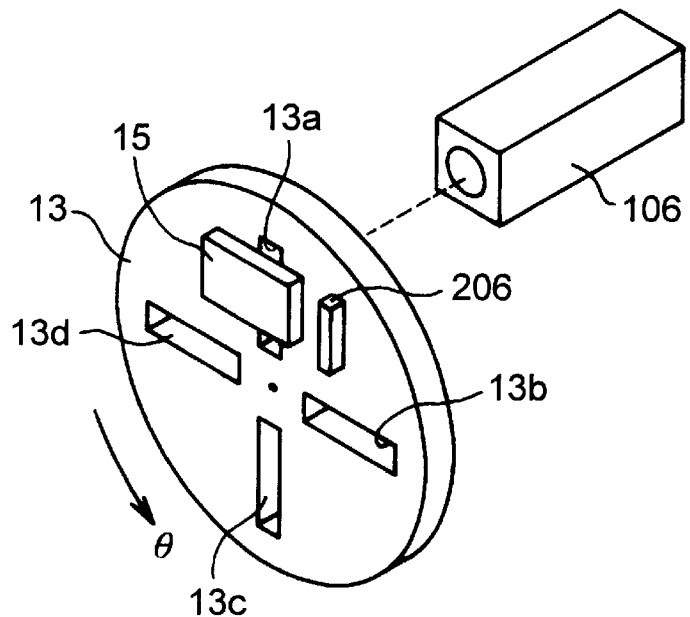
FIGS. 14A to 14C are explanatory views showing an example of modes of installation of the noncontact temperature distribution measuring apparatus.
Figure 14B:
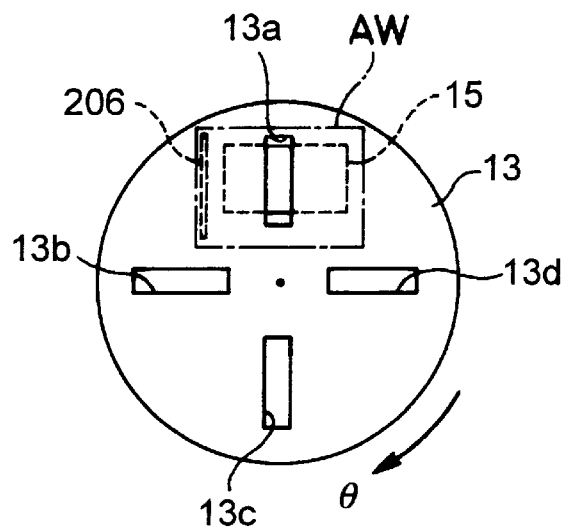
Figure 14C:
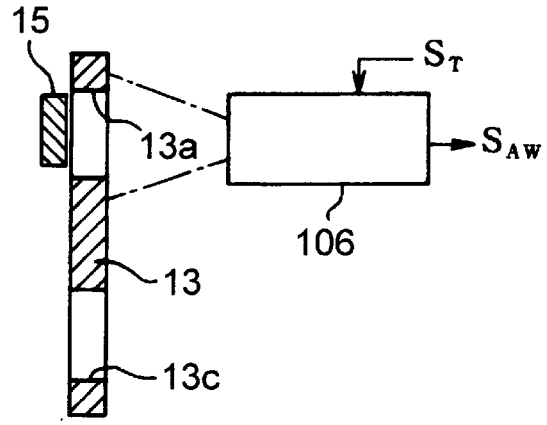

FIG. 13 is a block diagram showing a configuration of the noncontact temperature distribution measuring apparatus in accordance with this embodiment, whereas FIGS. 14A to 14C are views showing an example of modes of installation of the noncontact temperature distribution measuring apparatus in accordance with this embodiment with respect to an object to be measured.

As shown in FIG. 13, the noncontact temperature distribution measuring apparatus in accordance with this embodiment comprises an imaging unit 202 for capturing an object to be measured, and an analyzing unit 204 for analyzing an image signal SAW outputted from the imaging unit 202 so as to determine a two-dimensional temperature distribution of the object to be measured.

As shown in FIGS. 14A to 14C, the imaging unit 202 comprises a camera mechanism 106 for imaging with a two-dimensional imaging device, and a positioning member 206 made of a heating element, phosphor, light-emitting device, or the like adapted to emit a radiation energy in conformity to the light-receiving sensitivity of the two-dimensional imaging device.

The camera mechanism 106 and the positioning member 206 are disposed at appropriate positions with respect to the object to be measured. For example, in the case where a two-dimensional temperature distribution is measured in a sliding face (friction face) between a rotating member 13 and a contact member 15 in contact with a side wall of the rotating member 13 as shown in FIG. 14A, the positioning member 206 is disposed near the contact member 15 on the same side, whereas the camera mechanism 106 is disposed on the rear side, i.e., outside, of the rotating member 13, such that the rotating member 13 is interposed between the camera mechanism 106 and the positioning member 206.

Further, the side wall of the rotating member 13 (its part on the sliding locus of the contact member 15) is provided with at least one opening. FIG. 14A shows, as an example, a case where four openings 13a, 13b, 13c, and 13d each made of a through hole are provided. When the openings 13a to 13d are thus provided, as the rotating member 13 rotates, the inner faces of the positioning member 206 and contact member 15 are temporarily exposed through the openings 13a to 13d as shown in FIG. 14B, such that these inner faces, i.e., exposed faces, can be captured by the camera mechanism 106. As shown in FIG. 14C, capturing magnification, focus, and the like are adjusted such that the sliding face (friction face) of the contact member 15 to be measured and the positioning member 206 are held within the capturable area (view area indicated by chain line AW) of the camera mechanism 106.

Figure 15:
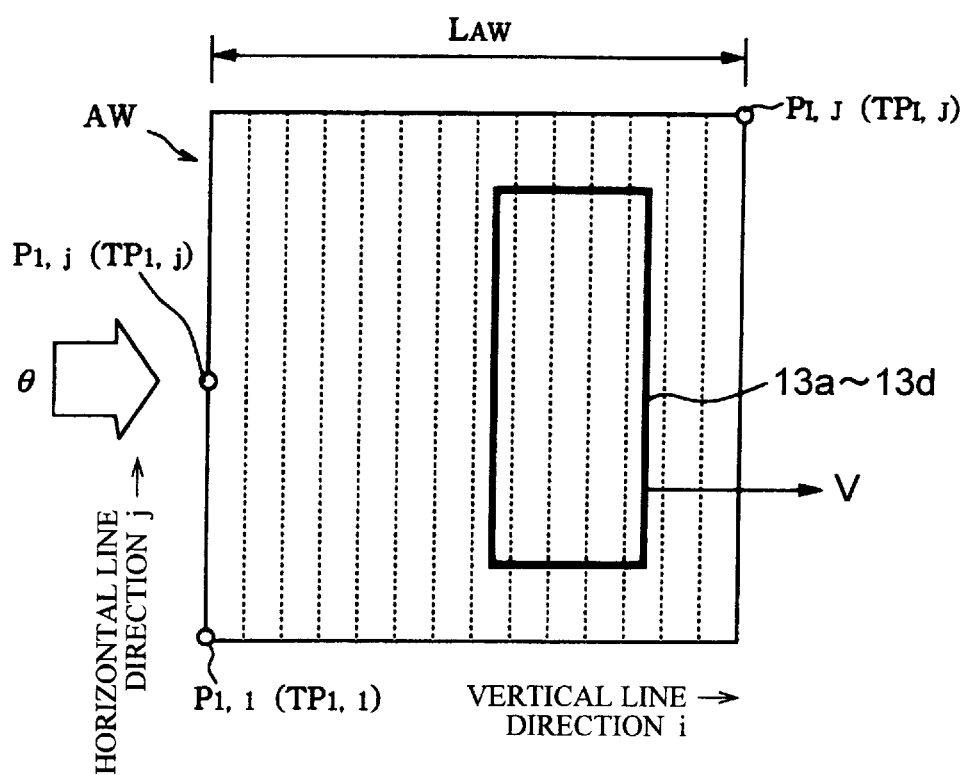
FIG. 15 is an explanatory view for explaining the principle of imaging-scanning.

As shown in FIG. 15, the camera mechanism 106 is disposed such that the horizontal line direction j of the two-dimensional imaging device incorporated therein and the rotating direction (circumferential direction) θ of the rotating member 13 are substantially orthogonal to each other. Therefore, as the rotating member 13 rotates, the openings 13a to 13d are caused to move within the capturable area AW from the first (i=1) horizontal line side along the vertical line direction i.

The above-mentioned openings are not restricted to through holes but may be cutouts as well, and may have any size. Namely, it is only necessary that the rotating member 13 be provided with an opening having such a shape to temporarily expose the inner side face of the contact member 15 therethrough. In the case where the rotating member 13 already has a part corresponding to an opening, it is not necessary to form a new opening.

When the imaging unit 202 is thus positioned, a two-dimensional temperature distribution in a sliding face between a rotary disc and a brake pad in a disc brake for a vehicle, a sliding face of a power-transmitting clutch plate, or the like, for example, can be measured.

In FIG. 13, the analyzing unit 204 comprises a control section 14 including a microprocessor (MPU) or the like having an arithmetic control function and controlling the operation of the whole analyzing unit 204; an imaging control section 16 for controlling the capturing operation of the camera mechanism 106; an image processing section 18 for determining a two-dimensional temperature distribution of a sliding face of the object to be measured according to the image signal $S_{AW}$ outputted from the camera mechanism 106; and an I/O port 20 for connecting with external devices such as an external display, an external storage device, a keyboard, and the like. The control section 14, imaging control section 16, image processing section 18, and I/O port 20 are connected to each other through a so-called bus line 21.

The imaging control section 16 comprises a synchronization detector 22, a measurement condition setting part 24, a measurement condition storage memory 26, and a driver 28.

According to changes in amplitude of the pixel signal outputted from a specific pixel in the two-dimensional imaging device incorporated in the camera mechanism 106 (e.g., the pixel signal $P_{1,j}$ outputted from the pixel positioned at line 1, column j in FIG. 15) in the image signal SAW outputted while the rotating member 13 is rotating, the synchronization detector 22 detects points of instant (hereinafter referred to as first synchronization points of time) $t_{Fa}$, $t_{Fb}$, $t_{Fc}$, $t_{Fd}$ at which the positioning member 206 is exposed through the respective openings 13a to 13d and points of instant (hereinafter referred to as second synchronization points of time) $t_{Ea}$, $t_{Eb}$, $t_{Ec}$, $t_{Ed}$ at which the positioning member 206 is separated from the respective openings 13a to 13d.

Figure 16:
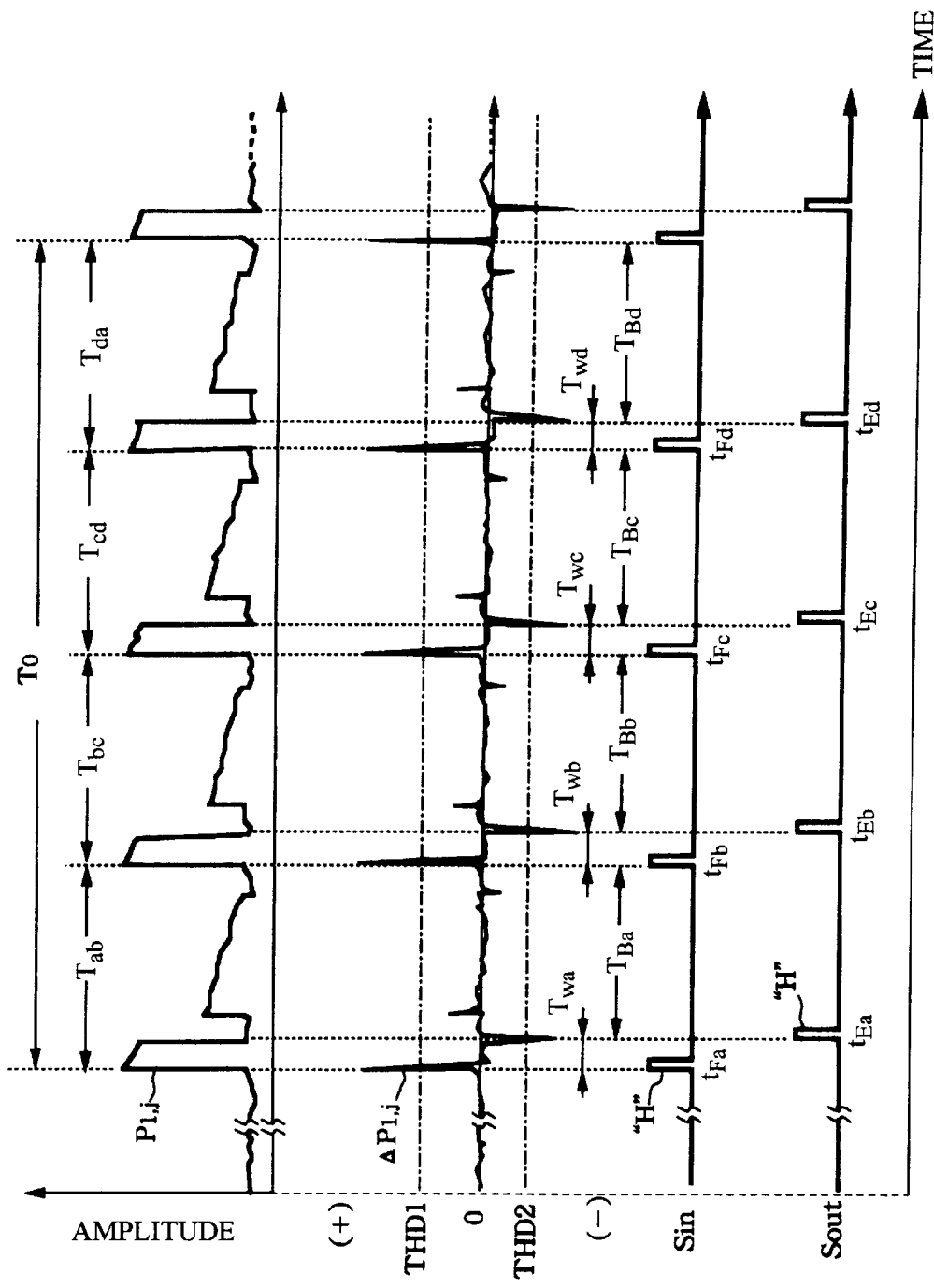
FIG. 16 is a timing chart for explaining the principle of synchronizing an object to be measured and imaging-scanning with each other.

FIG. 16 is a timing chart showing operations of the timing detector 22 for detecting the first synchronization points of time and second synchronization points of time. In FIG. 16, as the rotating member 13 rotates, the individual openings 13a to 13d pass over the positioning member 206, whereby the amplitude of the pixel signal $P_{1,j}$ outputted from the specific pixel in the two-dimensional imaging device changes. Subjecting the pixel signal $P_{1,j}$ to differential processing yields a pulse-shaped differential waveform signal $\Delta P_{1,j}$. Further formed are a first synchronization signal Sin which becomes logical "H" at the point of time when the pulse waveform on the plus side of the differential waveform signal $\Delta P_{1,j}$ exceeds a predetermined threshold THD1, and a second synchronization signal Sout which becomes logical "H" at the point of time when the pulse waveform on the minus side of the differential waveform signal $\Delta P_{1,j}$ exceeds a predetermined threshold THD2. Then, the points of time when the first synchronization signal Sin becomes logical "H" are judged to be the first synchronization points of time $t_{Fa}$, $t_{Fb}$, $t_{Fc}$, $t_{Fd}$, and the points of time when the second synchronization signal Sout becomes logical "H" are judged to be the second synchronization points of time $t_{Ea}$, $t_{Eb}$, $t_{Ec}$, $t_{Ed}$.

According to the first synchronization point of time $t_{Fa}$, $t_{Fb}$, $t_{Fc}$, $t_{Fd}$ and second synchronization points of time $t_{Ea}$, $t_{Eb}$, $t_{Ec}$, $t_{Ed}$ set by the first and second synchronization signals Sin, Sout, the measurement condition setting part 24 determines the time $T_0$ required for the rotating member 13 to make one revolution, the rotational speed V of the rotating member 13, the passing times $T_{wa}$, $T_{wb}$, $T_{wc}$, $T_{wd}$ required for the positioning member 206 to pass over the respective openings 13a to 13d, the passing times $T_{ab}$, $T_{bc}$, $T_{cd}$, $T_{da}$ required for the positioning member 206 to pass over the respective side wall portions where the openings 13a to 13d are not formed, the periods of time $T_{Ba}$, $T_{Bb}$, $T_{Bc}$, $T_{Bd}$ from the first synchronization points of time to their next second synchronization points of time, the opening widths $W_a$, $W_b$, $W_c$, $W_d$ of the respective openings 13a to 13d in the circumferential direction θ, and the like.

Also, the ratios $T_{Ba}/T_{Wa}$, $T_{Bb}/T_{Wb}$, $T_{Bc}/T_{Wc}$, $T_{Bd}/T_{Wd}$ of the above-mentioned times $T_{Ba}$, $T_{Bb}$, $T_{Bc}$, $T_{Bd}$ and $T_{Wa}$, $T_{Wb}$, $T_{Wc}$, $T_{Wd}$ are computed, and the maximum values of these ratios are defined as a divisor G (which is an integer rounding off or truncating the decimal part) by which the capturable area AW can be divided into the respective openings 13a to 13d. For example, when the ratio of $T_{Ba}/T_{Wa}$ becomes its maximum value, this value is employed as a divisor for dividing the capturable area AW by G.

Further, the shortest time among the above-mentioned times $T_{Wa}$, $T_{Wb}$, $T_{Wc}$, $T_{Wd}$ is divided by a predetermined integer N, and the resulting time value is defined as a basic delay time Δ. For example, when there is a relationship of $T_{Wa} < T_{Wb} < T_{Wc} < T_{Wd}$, $\Delta = T_{Wa}/N$. As will be explained later in detail, the basic delay time Δ is used for setting a shutter timing of the camera mechanism 106.

Then, the measurement condition data $T_0$, V, $T_{wa}$ to $T_{wd}$, $T_{ab}$ to $T_{da}$, $T_{Ba}$ to $T_{Bd}$, $W_a$ to $W_d$, G, and $\Delta$ determined by the measurement condition setting part 24 are stored into the measurement condition storage memory 26, and are utilized when the image processing section 18 determines a two-dimensional temperature distribution.

Whenever the points of time (first synchronization points of time) $t_{Fa}$, $t_{Fb}$, $t_{Fc}$, $t_{Fd}$ at which the first synchronization signal Sin outputted from the synchronization detector 22 becomes logical "H" are detected, the driver 28 supplies a shutter signal $S_T$ to the camera mechanism 106 at the point of time when a delay time $\tau m$ (=$m\Delta$) which is an integral multiple m of the basic delay time $\Delta$ has elapsed from the individual first synchronization points of time.

Namely, when the first synchronization point of time $t_{Fa}$ is detected as the rotating member 13 rotates, at this point of time $t_{Fa}$, the camera mechanism 106 is caused to perform a capturing operation and output an image signal $S_{AW}$ corresponding to one frame image. Subsequently, when the first synchronization point of time $t_{Fb}$ is detected, at the point of time later than the point of time $t_{Fb}$ by a delay time $\tau_1(=\Delta)$ the camera mechanism 106 is caused to perform a capturing operation and output an image signal $S_{AW}$ corresponding to one frame image. Subsequently, when the first synchronization points of time $t_{Fc}$, $t_{Fd}$ are detected, at the points of time after delay times $\tau_2(=2\Delta)$, $\tau_3(=3\Delta)$, respectively, the camera mechanism 106 is caused to perform capturing operations and output their corresponding image signals $S_{AW}$. Until the time (=$\Delta \times G \times N$) required for the individual openings 13a to 13d to pass over the capturable area AW is reached, the delay time $\tau m$ is successively elongated by an increment of the basic delay time $\Delta$. After the time (=$\Delta \times G \times N$) is reached, the delay time $\tau m$ is reset and, while it is successively elongated from the basic delay time $\Delta$, the shutter timing for the camera mechanism 106 is set; and this processing is repeated.

As the camera mechanism 106 is caused to perform the capturing operation while the delay time $\tau m$ is variably controlled in synchronization with the first synchronization points of time $t_{Fa}$, $t_{Fb}$, $t_{Fc}$, $t_{Fd}$, as shown in FIGS. 17A to 17H, the whole sliding face of the contact member 15 within the capturable area AW is captured while the same location (e.g., location of x in these drawings) in the exposed face of the contact member 15 is captured N times each during the period of time when the individual openings 13a to 13d pass over the capturable area AW. For example, when setting N=4, the imaging-scanning operation is effected while the same location x of the exposed face of the contact member 15 is captured four times during the period of time when the openings 13a to 13d pass.

In FIG. 13, the image processing section 18 comprises an A/D converter 30, a temperature compensator 32, a measurement area extractor 34, an exposure time judgment part 36, a temperature change characteristic computing part 38, a temperature distribution computing part 40, an image synthesizer 42, a captured image memory 44, a temperature change characteristic memory 46, and a synthesizing image memory 48.

For each delay time $\tau m$ mentioned above, the A/D converter 30 converts the image signal $S_{AW}$ captured by the camera mechanism 106 and outputted therefrom into digital image data $D_{AW}$, which are then stored into the captured image memory 44 as a frame image file related to each delay time $\tau m$.

The temperature compensator 32 converts the digital image data $D_{AW}$ indicative of a luminance component stored in the captured image memory 44 into digital image data $TD_{AW}$ indicative of a temperature component (hereinafter referred to as temperature image data). Then, the temperature image data $TD_{AW}$ are stored again into the captured image memory 44 as a frame image file related to each delay time $\tau m$. Here, by applying the above-mentioned Stefan-Boltzmann equation (1) to each pixel data $P_{i,j}$ (where $1 \leq i < I$, $1 \leq j \leq J$) constituting the digital data $D_{AW}$, the temperature image data $TD_{AW}$ of the temperature component are determined.

From a plurality of frame images of temperature image data $TD_{AW}$ stored in the captured image memory 44, the measurement area extractor 34 extracts temperature image data $TR_B$ which correspond to the exposed face of the contact member 15 and stores thus extracted data into the synthesizing image memory 48. Namely, of the temperature image data $TD_{AW}$, the temperature image data necessary for measuring a two-dimensional temperature distribution are selected, whereby the temperature image data $TR_B$ are extracted.

Figure 18A:
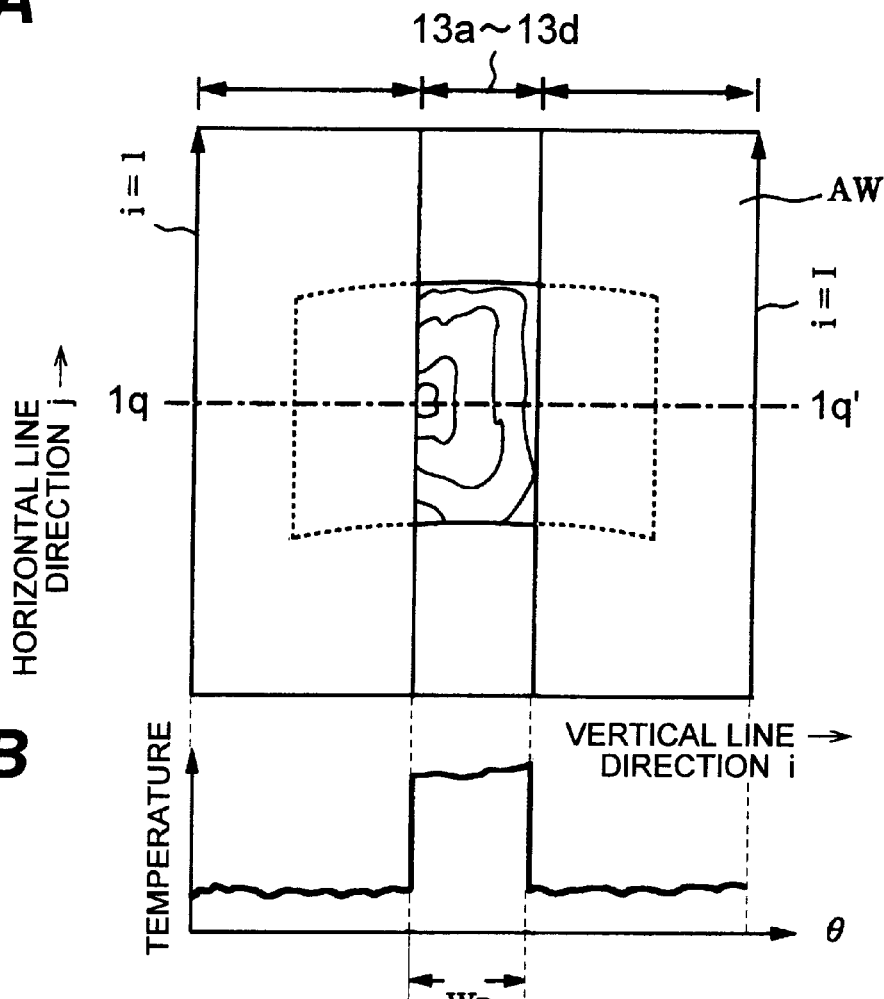
FIGS. 18A to 18C are explanatory views for explaining the principle of extracting image data of an exposed face.
Figure 18B:
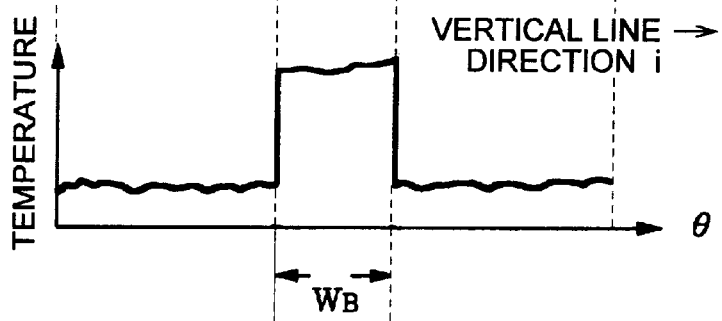
Figure 18C:
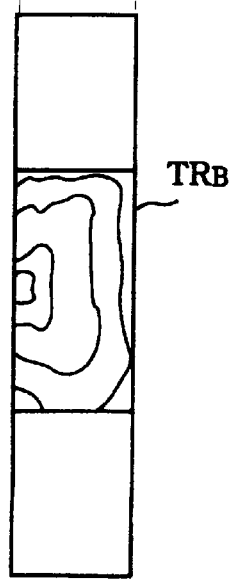

FIGS. 18A to 18C are views showing the principle of extracting temperature image data $TR_{AW}$ which correspond to the exposed face. As for the temperature image data $TR_{AW}$ in each frame image file shown in FIG. 18A, a temperature change distribution of temperature pixel data which are obtained from a pixel group (e.g., the pixel group on the 1q—1q' line in FIG. 18A) along the vertical line direction i of the two-dimensional imaging device is studied, and temperature image data $TR_B$ which exist within an area $W_B$, shown in FIG. 18B, extending from the rising portion to trailing portion of the change are extracted as shown in FIG. 18C and are stored again into the synthesizing image memory 48 without disturbing their pixel arrangement.

According to each temperature image data $TR_B$, the exposure time judging part 36 computes the time (hereinafter referred to as exposure time) $\tau$ that has elapsed from the point of time (instant) when each location of the contact member 15 in an unexposed state attains an exposed state through the openings 13a to 13d until thus exposed location is captured by the camera mechanism 106.

With reference to FIGS. 17A to 17H and 19A to 19C, the principle of computing this exposure time $\tau$ will be explained. As shown in FIGS. 17A to 17H, each of the openings 13a to 13d moves along the vertical line direction i of the two-dimensional imaging device incorporated in the camera mechanism 106. On the other hand, the exposed face of the contact member 15 relatively moves in the direction opposite to the individual openings 13a to 13d. As a consequence, among the individual locations of the exposed face, the exposure time $\tau$ becomes longer in the location closer to the rear end of each opening 13a to 13d. For example, the exposure time $\tau$ in the same specific location x shown in FIGS. 17E to 17H gradually becomes longer from FIG. 17E to FIG. 17H.

Figure 19A:
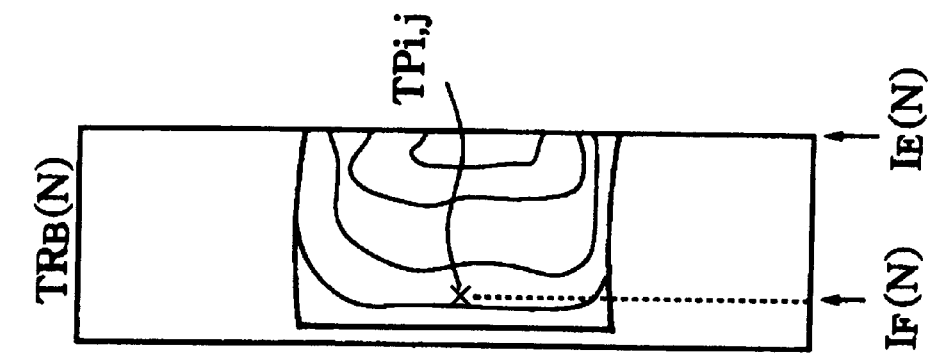
FIGS. 19A to 19C are explanatory views for explaining the principle of determining exposure time.
Figure 19B:
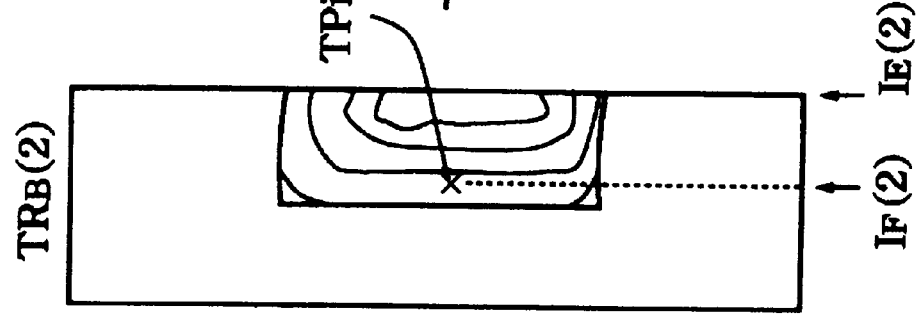
Figure 19C:
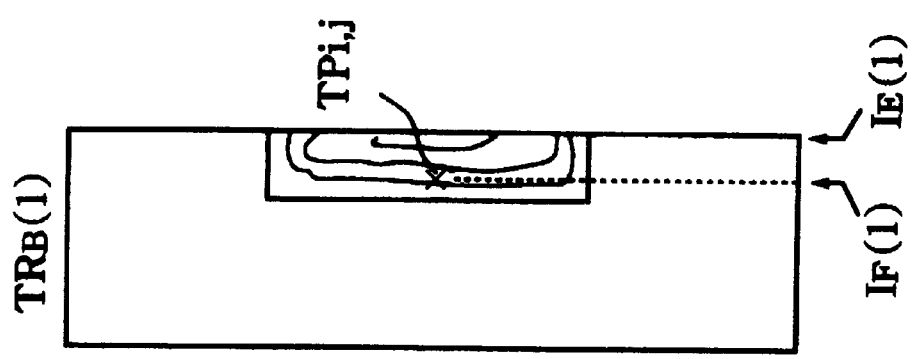

Therefore, as shown in FIGS. 19A to 19C, a plurality of temperature image data $TR_B(1)$ to $TR_B(N)$ having the temperature pixel data $TP_{i,j}$ of the specific location x are read out from the synthesizing image memory 48, and detected in the temperature image data $TR_B(1)$ to $TR_B(N)$ are horizontal lines $I_E(1)$ to $I_E(N)$ which are the respective last lines in temperature image data $TR_B(1)$ to $TR_B(N)$ and horizontal lines $I_F(1)$ to $I_F(N)$ where the temperature pixel data $TP_{i,j}$ corresponding to the specific location x are positioned. Further, the numbers of the horizontal lines $I_F(1)$–$I_E(1)$, ..., $I_F(N)$–$I_E(N)$ existing between the horizontal lines $I_E(1)$, ..., $I_E(N)$ and $I_F(1)$, ..., $I_F(N)$, respectively, are calculated. Then, these numbers of the horizontal lines $I_F(1)$–$I_E(1)$, ..., $I_F(N)$–$I_E(N)$ are multiplied by the time $\delta$ required for the openings 13a to 13d to pass over one horizontal line span, whereby the exposure times τ(1) to τ(N) of the specific location x are determined.

Namely, the exposure time τ(1) of the temperature pixel data $TP_{i,j}$ in the temperature image data $TR_B(1)$ shown in FIGS. 19A to 19C becomes $τ(1)=(I_F(1)–I_E(1))×δ$, the exposure time τ(2) of the temperature pixel data $TP_{i,j}$ in the temperature image data $TR_B(2)$ becomes $τ(2)=(I_F(2)–I_E(2))×δ$, and, successively in a similar manner, the exposure time τ(N) of the temperature pixel data $TP_{i,j}$ in the temperature image data $TR_B(N)$ becomes $τ(N)=(I_F(N)–I_E(N))×δ$. Also, the exposure time τ of the remaining temperature pixel data is determined similarly.

Here, the time τ is determined by the relational expression of $δ=L_{AW}/(I×V)$ according to the rotational speed V of the rotating member 13 and the length $L_{AW}$ of the capturable area AW in the circumferential direction θ and the total number of horizontal lines I of the two-dimensional imaging device. The variable N is the above-mentioned divisor N.

For a plurality of files of temperature image data $TR_B$ stored in the synthesizing image memory 48, the temperature change characteristic computing part 38 arranges the pixel data $TP_{i,j}$ corresponding to the same location of the contact member 15 along the exposure times τ(1) to τ(N), thereby estimating and computing a temperature characteristic curve $CP_{i,j}$ indicative of the tendency of temperature change after this location is exposed.

FIGS. 20A to 20E representatively shows the principle of computing a temperature characteristic curve $CP_{i,j}$ concerning the temperature pixel data $TP_{i,j}$ corresponding to a certain specific location of the exposed face. In FIG. 20A, N pieces of temperature pixel data $TP_{i,j}(1)$ to $TP_{i,j}(N)$ are read out from N frames of temperature image data $TR_B(1)$ to $TR_B(N)$ (These are shown in FIGS. 20B to 20E) obtained in synchronization with the above-mentioned delay time τm, and are arranged along the respective exposure times τ(1) to τ(N). Statistical processing such as curve fitting or method of least squares, neural network technique, or the like is used for estimating and computing the temperature characteristic curve $CP_{i,j}$ indicative of the tendency of change in the pixel data $TP_{i,j}(1)$ to $TP_{i,j}(N)$. Also, similar estimating and computing operations are carried out for the remaining locations of the exposed face, whereby the temperature characteristic curves $CP_{i,j}$ for all the locations are determined, and thus determined data are stored into the temperature change characteristic storage memory 46.

According to the data of the temperature characteristic curves $CP_{i,j}$ stored in the temperature change characteristic storage memory 46, the temperature distribution computing part 40 estimates and computes a temperature distribution $TP_{i,j}(t_r)$ at an instant $t_r$ when each location of the contact member 15 has attained an exposed state, and data of thus computed result are stored into the synthesizing image memory 48 again. This temperature distribution $TP_{i,j}(t_r)$ is a value which is very close to the temperature of each of the originally hidden locations of the sliding face.

Here, the temperature distribution computing part 40 carries out arithmetic processing in relation to each region obtained by dividing the capturable area AW by the above-mentioned divisor G, thereby turning the data of temperature distribution $TP_{i,j}(t_r)$ into G pieces of temperature image data TS(1) to TS(G), which are then stored into the synthesizing image memory 48.

As shown in FIGS. 21A to 21D, the image synthesizer 42 reads out a plurality of temperature image data TS(1) to TS(G) stored in the synthesizing image memory 48, and arrange them in conformity to the shape of the sliding face of the contact member 15 as shown in FIG. 21E. Further, by interpolating the data lacking portions, it yields two-dimensional temperature distribution data TSB indicative of the two-dimensional temperature distribution of the whole sliding face as shown in FIG. 21F, which are then stored into the synthesizing image memory 48. Also, the two-dimensional temperature distribution data TSB are processed so as to be stored into an external storage device, reproduced and displayed on an external monitor, printed as a hard copy, and so forth by way of the I/O port 20.

A series of operations of this noncontact temperature distribution measuring apparatus will now be explained with reference to the flowchart shown in FIG. 9.

As the apparatus is started, the image control section 16 is actuated at step S100, whereby, while the rotating member 13 makes 5 to 10 revolutions, the synchronization detector 22 and the measurement condition setting part 24 determine various kinds of measurement conditions such as the above-mentioned basic delay time Δ, rotational speed V of the rotating member 13, and the like according to the image signal $S_{AW}$. During this processing, the image processing section 18 does not carry out the processing for determining a two-dimensional temperature distribution, but the image signal $S_{AW}$ is simply transferred to an external display or the like by way of the A/D converter 30 and I/O port 20.

After the above-mentioned various kinds of measurement conditions are determined, the flow proceeds to step S110, where the image processing section 18 is actuated. First, at step S120, the image signal $S_{AW}$ outputted from the camera mechanism 106 in synchronization with the delay time τm set by the driver 28 is converted into digital image data $D_{AW}$ by the A/D converter 30, which are then stored into the captured image memory 44. Here, the imaging processing is carried out until a number of frame images of digital image data $D_{AW}$ sufficient for determining a two-dimensional temperature distribution of the sliding face between the rotating member 13 and the contact member 15 are collected.

After sufficient digital image data $D_{AW}$ are collected, at step S130, the temperature compensator 32 converts the digital image data $D_{AW}$ of a luminous component into temperature image data $TD_{AW}$ of a temperature component. Then, at step S140, the measurement area extractor 34 extracts temperature image data $TR_B$ concerning the sliding face from the temperature image data $TD_{AW}$. Subsequently, at step S150, the exposure time judging part 36 determines the exposure time τ of each location of the exposed face according to the temperature image data $TR_B$. Then, at step S160, the temperature change characteristic computing part 38 determines the temperature characteristic curve $CP_{i,j}$ at each location of the exposed face.

At step S170, according to the above-mentioned temperature characteristic curve $CP_{i,j}$, the temperature distribution computing part 40 computes the two-dimensional temperature distribution data TS(1) to TS(G). Then, at step S180, the image synthesizer 42 combines the two-dimensional temperature distribution data TS(1) to TS(G) together, thereby yielding synthetic two-dimensional temperature distribution data TSB indicative of the two-dimensional temperature distribution of the whole sliding face, thus completing the series of processing operations.

Thus, in this embodiment, an exposed image of the sliding face between mutually moving objects to be measured at the time it is temporarily exposed through an opening is subjected to image processing, whereby a two-dimensional temperature distribution of the originally hidden sliding face can be measured with a high accuracy.

Figure 22:
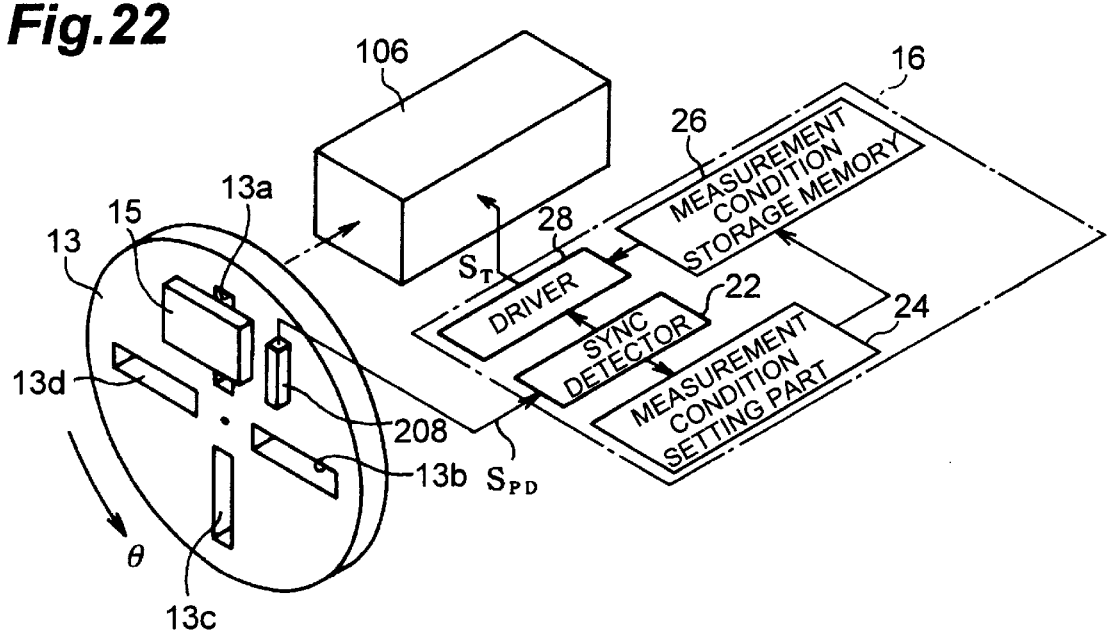
FIG. 22 is an explanatory configurational view showing another configurational example for synchronizing the object to be measured and imaging-scanning with each other.

Though the foregoing explanation indicates a configuration in which the positioning member 206 is captured with the camera mechanism 106 as shown in FIGS. 14A to 14C so as to determine measurement conditions such as the rotational speed V of the rotating member 13 and the like, the present invention should not be restricted thereto. For example, as shown in FIG. 22, in place of the positioning member 206, a reflection or transmission type photo-interrupter (optical sensor 208) may be disposed near the openings 13a to 13d of the rotating member 13, such that the detection signal $S_{PD}$ of the optical sensor 208 is supplied to the synchronization detector 22. In this configuration, the synchronization signals Sin, Sout shown in FIG. 16 are generated according to changes in amplitude of the detection signal $S_{PD}$, whereby the measurement conditions such as the rotational speed V of the rotating member 13 and the like can be determined.

Though the foregoing explanation relates to a configuration in which the imaging control section 16 is provided with the measurement condition setting part 24, which automatically determines the above-mentioned measurement conditions, the present invention should not be restricted to such a configuration. For example, in the case where the above-mentioned measurement conditions such as rotational speed V, basic delay time Δ, and the like have been known, these measurement condition data may be stored into the measurement condition storage memory 26 beforehand by way of the I/O port 20. In this case, the measurement condition setting part 24 can be omitted.

In the case where the materials of the rotating member 13 and contact member 15 and the temperature change characteristic at the time when their sliding face attains an exposed state have already been known, the data of temperature characteristic curve $CP_{i,j}$ may be stored into the temperature change characteristic storage memory 46 by way of the I/O port 20. In this case, the exposure time judging part 36 and the temperature change characteristic computing part 38 may be omitted.

When the basic delay time Δ is made equal to a so-called frame period which has already been set in the camera mechanism 106, the imaging control section 16 may be omitted. Namely, the synchronization detector 22, measurement condition setting part 24, measurement condition storage memory 26, and driver 28 in the imaging control section 16 shown in FIG. 13 may be omitted, and the above-mentioned image processing may be carried out in the image processing section 18 while employing this frame period as the basic delay time Δ, so as to determine a two-dimensional temperature distribution. In this case, synchronization detecting members such as the above-mentioned positioning member 206, optical sensor 208, and the like may be omitted as well.

Though a configuration in which the camera mechanism 106 equipped with a two-dimensional imaging device carries out plane-sequential imaging has been explained, a configuration for effecting line-sequential imaging or dot-sequential imaging may be employed as well.

Figure 23:
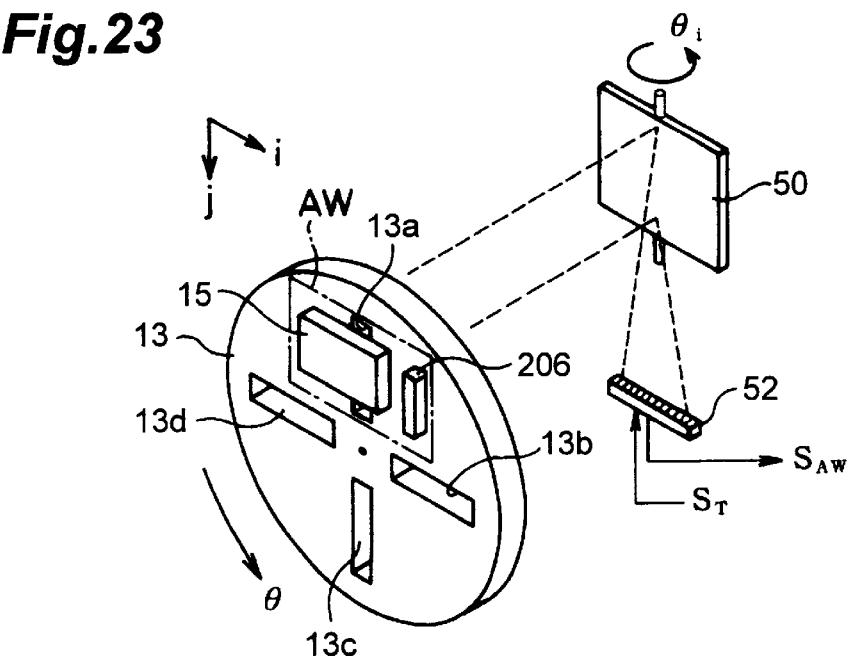
FIG. 23 is an explanatory configurational view showing a modified example of the imaging unit.

FIG. 23 shows a configurational example of a camera mechanism for effecting line-sequential imaging. Disposed in FIG. 23 are a rotary mirror 50 placed on the rear side of the rotating member 13 and constantly rotating at a predetermined angular velocity of Δi in a direction $θ_i$ which is identical to the rotating direction θ of the rotating member 13, and a line sensor 52 for receiving a light image reflected by the rotary mirror 50, whereas the image signal $S_{AW}$ outputted from the line sensor 52 is supplied to the A/D converter 30 in FIG. 13. The image signal $S_{AW}$ is turned into digital image data $D_{AW}$ in frame image units, which are then taken into the captured image memory 44. As the digital image data $D_{AW}$ are subjected to the above-mentioned image processing in the image processing section 18, a two-dimensional temperature distribution can be determined.

Figure 24:
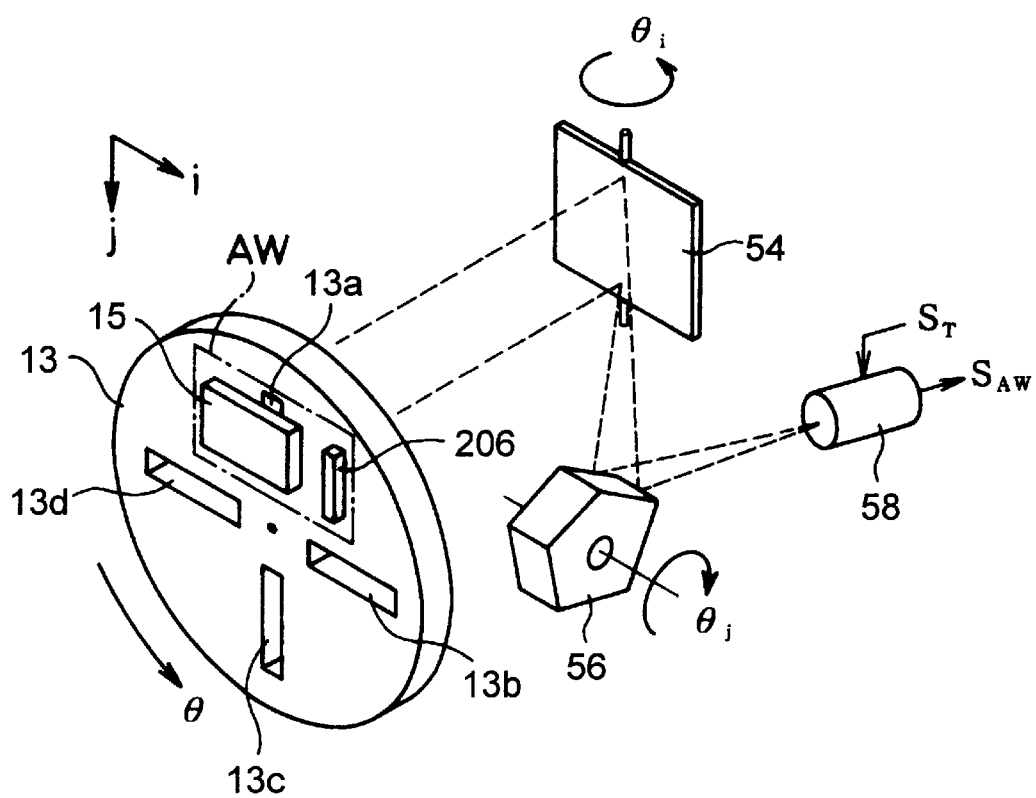
FIG. 24 is an explanatory configurational view showing another modified example of the imaging unit.

FIG. 24 shows a configurational example of a camera mechanism for effecting dot-sequential imaging. Disposed in FIG. 24 are a rotary mirror 54 placed on the rear side of the rotating member 13 and constantly rotating at a predetermined angular velocity of Δi in a direction $θ_i$ which is identical to the rotating direction θ of the rotating member 13, a polygon mirror 56 constantly rotating at a predetermined angular velocity of Δj in a direction $θ_j$ which is orthogonal to the rotating direction $θ_i$ of the rotary mirror 54, and a light-receiving device 58 such as a phototransistor for receiving the light reflected by the polygon mirror 56, whereas the image signal $S_{AW}$ outputted from the light-receiving device 56 is supplied to the synchronization detector 22 and A/D converter 30 in FIG. 13. The image signal $S_{AW}$ is turned into digital image data $D_{AW}$ in frame image units, which are then taken into the captured image memory 44. As the digital image data $D_{AW}$ are subjected to the above-mentioned image processing in the image processing section 18, a two-dimensional temperature distribution can be determined.

Such a configuration for effecting line- or dot-sequential imaging-scanning can realize a camera mechanism less expensive than that obtained by a plane-sequential imaging type camera mechanism 106.

Though the foregoing explanation relates to applied examples for measuring a two-dimensional temperature distribution of the sliding face between a rotary disc and a brake pad in a disc brake for a vehicle and the like, two-dimensional temperature distributions may also be measured in other objects to be measured.

Figure 25:
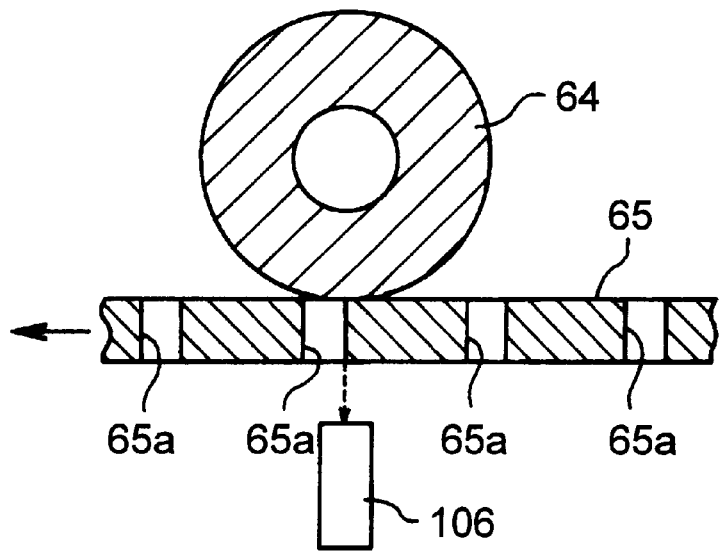
FIG. 25 is an explanatory view for explaining another applied example of the noncontact temperature distribution measuring apparatus.

FIG. 25 shows a case where a two-dimensional temperature distribution is measured in a contact face with respect to a simulated road surface 65 in order to determine braking characteristics of a tire 64 for an airplane or vehicle. The simulated road face 65 has a structure in which a road surface member such as asphalt is laminated on a steel plate, and is provided with a number of openings 65a. The tire 64 is disposed in contact with the surface of the road surface member of the simulated road surface 65, whereas the noncontact temperature distribution measuring apparatus is disposed such that its camera mechanism 106 faces the rear side of the simulated road surface 65. Then, as the simulated road surface 65 is moved in a direction along which the openings 65a are provided, the sliding face of the tire 64 is temporarily exposed through the openings 65a. As thus exposed face is captured and subjected to the above-mentioned image processing, a two-dimensional temperature distribution of the sliding face of the tire 64 can be measured.

Figure 26:
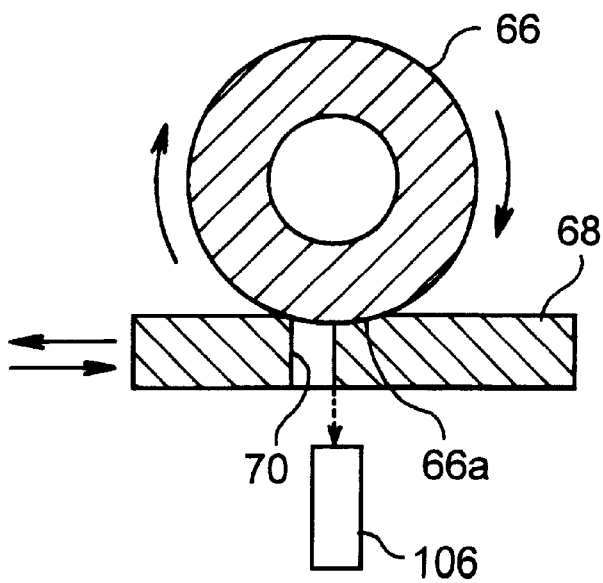
FIG. 26 is an explanatory view for explaining still another applied example of the noncontact temperature distribution measuring apparatus.

FIG. 26 shows a case measuring a two-dimensional temperature distribution of a sliding face 66a of a grindstone 66 when the grindstone 66 is used for surface-grinding a member 68 to be ground. Rotating the grindstone 66 while moving the member to be ground 68 back and forth enables surface grinding. In this case, an opening 70 is disposed at a part of the member to be ground 68 facing the grindstone 66, and the camera mechanism 106 of the noncontact temperature distribution measuring apparatus is disposed so as to capture the sliding face 66a of the grindstone 66 through the opening 70, whereby a two-dimensional temperature distribution of the sliding face 66a can be measured.

Even in the case where both of the grindstone 66 and the member to be ground 68 move relative to the camera mechanism 106 as shown in FIG. 26, i.e., the case where both of the objects to be measured move relative to the camera mechanism 106 while both of them move relative to each other; it is possible to measure, through one object to be measured having the opening, a two-dimensional temperature distribution of the sliding face of the other object to be measured. Also, since a two-dimensional temperature distribution can thus be measured even in the case where both of the objects to be measured move relative to the camera mechanism 106; even in a case where the object to be measured having an opening is stopped (stands still) with respect to the camera mechanism 106 while the other object to be measured having no opening moves relative thereto, it is possible to measure a two-dimensional temperature distribution in the sliding face of the other object to be measured.

Figure 27A:
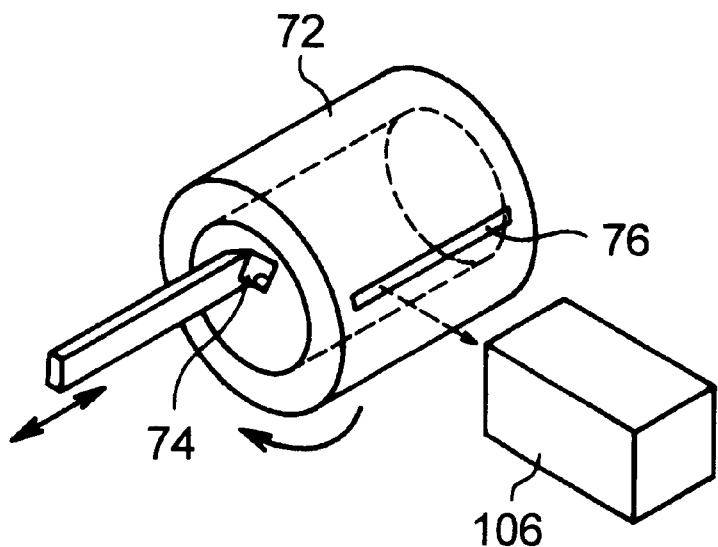
FIGS. 27A and 27B are explanatory views for explaining still other applied examples of the noncontact temperature distribution measuring apparatus.
Figure 27B:
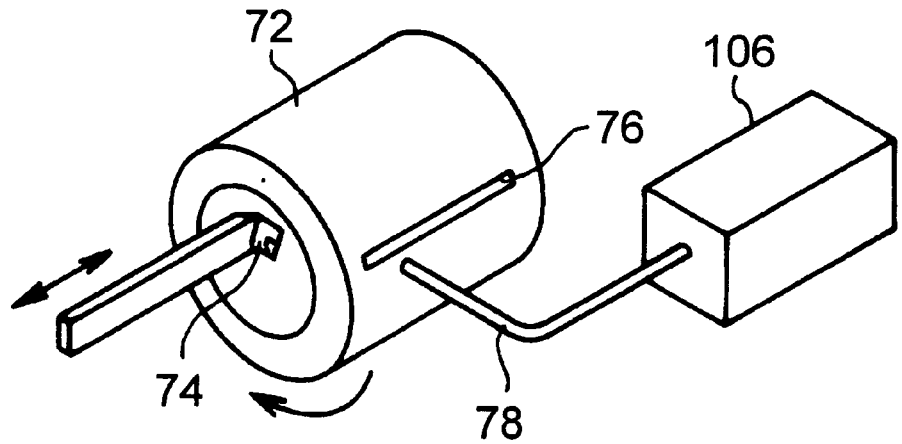

FIGS. 27A and 27B show a case measuring a two-dimensional temperature distribution of the sliding face between the inner peripheral face of a cylindrical member 72 rotating in a circumferential direction and a contact member 74 coming into contact with the inner peripheral face. For example, it corresponds to the case where the inner peripheral face of the cylindrical member 72 is ground with a whetstone which is the contact member 74, or the like.

In this case, as shown in FIG. 27A, an opening 76 is formed in the side wall of the cylindrical member 72, whereas the camera mechanism 106 of the noncontact temperature distribution measuring apparatus is disposed such as to capture the sliding face between the cylindrical member 72 and the contact member 74 through the opening 76, thus making it possible to measure a two-dimensional temperature distribution of this sliding face.

Also, as shown in FIG. 27B, a thin optical fiber 78 may be disposed so as to extend from the camera mechanism 106, such that the exposed image of the above-mentioned sliding face is introduced from the tip portion (light entrance end) of the optical fiber 78 so as to be captured by an imaging device. When the optical fiber 78 is thus provided, a two-dimensional temperature distribution can be measured in such a case where parts are hard to measure, the object to be measured is a small-sized member, the structure thereof is complicated, the sliding face is fine, or the like.

Though the foregoing explanation relates to applied examples in which a two-dimensional temperature distribution is measured in the sliding face between objects to be measured which move relative to each other while coming into contact with each other; it is also possible to measure, from the side of two objects to be measured moving relative to each other without coming into contact with each other, a two-dimensional temperature distribution of the inner side wall of the originally hidden other object.

Figure 28:
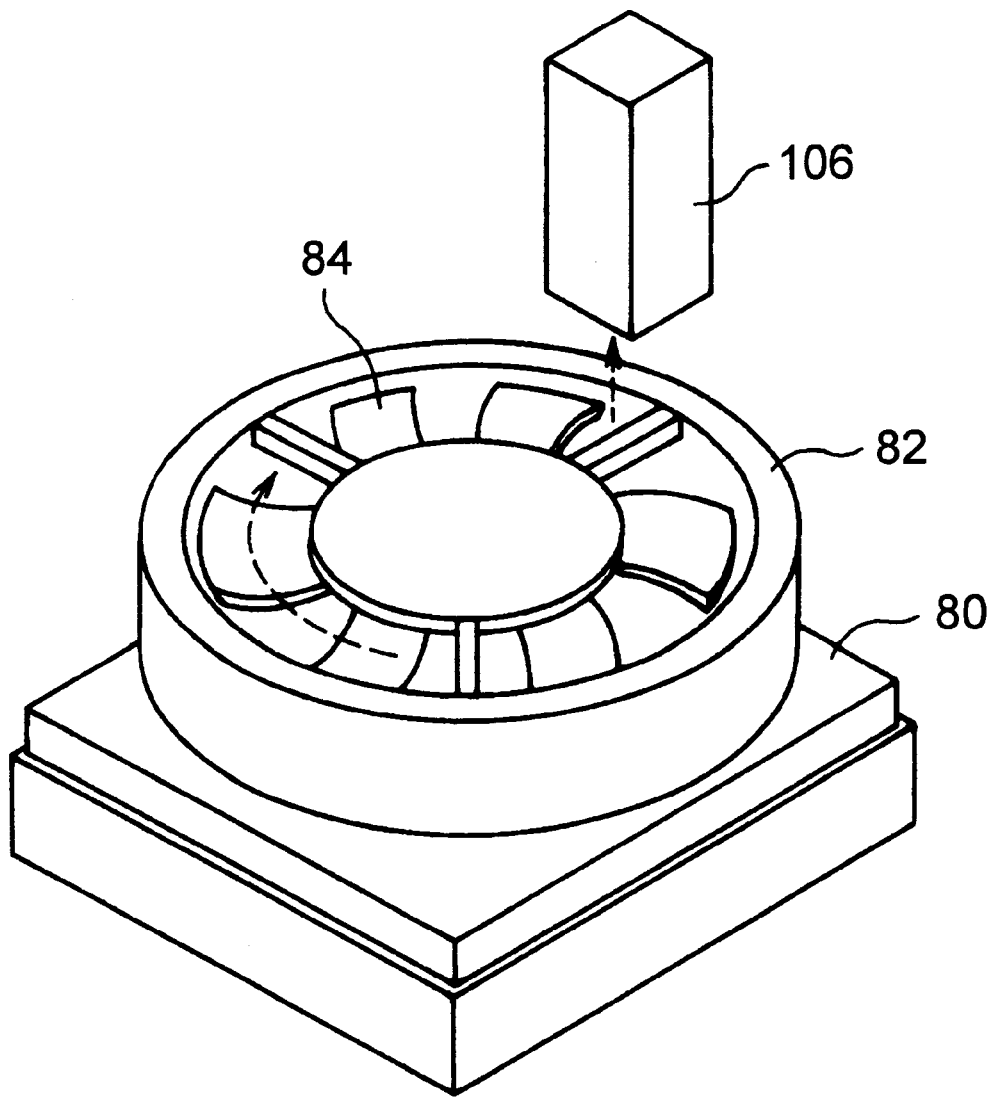
FIG. 28 is an explanatory view for explaining still another applied example of the noncontact temperature distribution measuring apparatus.

For example, as shown in FIG. 28, a two-dimensional temperature distribution of a surface of a microcomputer 80 which is incorporated in a computer system can be measured from outside an air-cooling fan 82. Namely, as a plurality of vanes 84 rotate, the air-cooling fan 82 discharges the heat of the microcomputer 80 to the outside. Therefore, when a conventional thermograph is simply used for measuring a two-dimensional temperature distribution of the surface of the microcomputer 80, it is obstructed by the vanes 84, whereby the two-dimensional temperature distribution of the surface of the microcomputer 80 cannot be measured at the same point of time. By contrast, in the noncontact temperature distribution measuring apparatus in accordance with the present invention, a two-dimensional temperature distribution of the surface of the microcomputer 80 that attains an unexposed state when the vanes 84 of the air-cooling fan 82 rotate can be computed, whereby the two-dimensional temperature distribution of the whole surface of the microcomputer 80 can be measured.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A noncontact temperature distribution measuring apparatus for measuring a two-dimensional temperature distribution of a cutting tool during a cutting process, said apparatus comprising:

cutting state setting means for setting, during said cutting process, a substantial cutting period for bringing said cutting tool and a material to be cut in contact with each other and a substantial noncutting period for separating said cutting tool and said material to be cut from each other;

imaging means for capturing said cutting tool a plurality of times at an interval of a predetermined delay time;

changing characteristic computing means for relating a plurality of image information items obtained upon a plurality of capturing operations effected by said imaging means, for each information item corresponding to an identical location of said cutting tool, to an exposure time which has elapsed from a switching point of time from said cutting period to said noncutting period, so as to determine a tendency of change in the image information with respect to said exposure time; and temperature distribution computing means for computing the two-dimensional temperature distribution of said cutting tool at said switching point of time according to said tendency of change determined by said changing characteristic computing means, wherein said imaging means has an imaging optical system which is set such as to effect imaging at a focal length not shorter than 50 mm and a resolving power finer than 30 $\mu$m.

2. A noncontact temperature distribution measuring apparatus for measuring, from outside one of objects moving relative to each other, a two-dimensional temperature distribution of an inner face of the other object facing said one object, said apparatus comprising:

imaging means for capturing an exposed image of the inner face of said other object a plurality of times with an interval of a predetermined delay time through an opening portion formed in said one object;

changing characteristic computing means for relating a plurality of image information items obtained upon a plurality of capturing operations effected by said imaging means, for each information item corresponding to an identical location of said exposed image, to an exposure time which has elapsed from a switching point of time when the inner face of said other object attains an exposed state through said opening portion from an unexposed state, so as to determine a tendency of change in the image information with respect to said exposure time; and temperature distribution computing means for computing the two-dimensional temperature distribution of the inner face of said other object at the switching point of time according to the tendency of change determined by said changing characteristic computing means.

3. A noncontact temperature distribution measuring apparatus according to claim 2, wherein, in a state where said one object moves while said other object stands still, said imaging means captures, through the opening portion formed in said one object, the exposed image of the inner face of said other object a plurality of times at an interval of a predetermined delay time.

4. A noncontact temperature distribution measuring apparatus according to claim 2, wherein, in a state where said one object stands still while said other object moves, said imaging means captures, through the opening portion formed in said one object, the exposed image of the inner face of said other object a plurality of times at an interval of a predetermined delay time.

5. A noncontact temperature distribution measuring apparatus according to claim 2, wherein, in a state where both of said objects move relative to said imaging means, said imaging means captures, through the opening portion formed in said one object, the exposed image of the inner face of said other object a plurality of times at an interval of a predetermined delay time.

6. A noncontact temperature distribution measuring apparatus according to claim 2, wherein said imaging means has synchronization detecting means for detecting a timing at which the inner face of said other object is exposed through the opening portion formed in said one object, and sets said delay time in synchronization with a detection output of said synchronization detecting means.

7. A noncontact temperature distribution measuring apparatus according to claim 2, comprising:

measurement area extracting means for extracting a plurality of image information items corresponding to said exposed image from a plurality of image information items obtained upon a plurality of capturing operations by said imaging means;

change characteristic computing means for relating the plurality of image information items corresponding to said exposed image extracted by said measurement area extracting means, for each information item corresponding to an identical location of said exposed image, to an exposure time which has elapsed from a switching point of time when the inner face of said other object attains an exposed state through said opening portion from an unexposed state, so as to determine a tendency of change in the image information with respect to said exposure time;

said temperature distribution computing means for computing the two-dimensional temperature distribution of said exposed image extracted at the switching point of time according to the tendency of change determined by said changing characteristic computing means; and synthesizing means for synthesizing the two-dimensional temperature distribution determined by said temperature distribution computing means, so as to form a two-dimensional temperature distribution of the inner face of said other object to be measured.

8. A noncontact temperature distribution measuring apparatus according to claim 2, wherein said imaging means has an optical fiber for guiding and capturing the exposed image of the inner face of said other object.

9. A noncontact temperature distribution measuring apparatus according to claim 2, wherein said objects move relative to each other while coming into contact with each other, the inner face of said other object being a sliding face upon said relative movement and contact.

* * * * *